(12) United States Patent  
Takeyama

(10) Patent No.: US 6,342,871 B1
(45) Date of Patent: Jan. 29, 2002

(54) IMAGE DISPLAY APPARATUS

(75) Inventor: Tetsuhide Takeyama, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/277,067

(22) Filed: Mar. 26, 1999

(30) Foreign Application Priority Data

Jan. 11, 1999 (JP) .......................................... 11-003729

(51) Int. Cl.$^7$ ................................................. G09G 5/00
(52) U.S. Cl. .............................. 345/7; 345/8; 359/631; 359/630
(58) Field of Search ............................... 359/630, 631, 359/364; 345/7, 8, 9

(56) References Cited

U.S. PATENT DOCUMENTS

| | | | | |
|---|---|---|---|---|
| 5,530,586 A | * | 6/1996 | Yasugaki | 359/364 |
| 5,546,227 A | * | 8/1996 | Yasugaki et al. | 359/630 |
| 5,594,588 A | * | 1/1997 | Togino | 359/631 |
| 5,701,202 A | * | 12/1997 | Takahashi | 359/631 |
| 5,726,807 A | * | 3/1998 | Nakaoka et al. | 359/631 |

FOREIGN PATENT DOCUMENTS

JP 10-504115 4/1998

* cited by examiner

Primary Examiner—Steven Saras
Assistant Examiner—Uchendu O. Anyaso
(74) Attorney, Agent, or Firm—Pillsbury Winthrop

(57) ABSTRACT

An image display apparatus having a compact optical system, in which the intermediate image magnifying power of a relay optical system is increased to realize a wide field angle while keeping the power of the concave mirror part of an ocular optical system at a small value. A viewing optical system has an image source-side reflecting surface having a decentered curved surface configuration that gives a power to a light beam emitted from an image display device when the light beam is reflected by the decentered curved surface. The image source-side reflecting surface also has a rotationally asymmetric surface configuration that corrects decentration aberrations produced by reflection at the decentered curved surface. The viewing optical system further has a semitransparent reflecting surface that transmits or reflects the light beam reflected from the image source-side reflecting surface, and a concave reflecting surface that forms a folded optical path between it and the semitransparent reflecting surface and that has a concave surface directed toward the semitransparent reflecting surface. An enlarged intermediate image of the image displayed on the image display device is formed between the image source-side reflecting surface and the semitransparent reflecting surface.

21 Claims, 12 Drawing Sheets

IMAGE DISPLAY APPARATUS

BACKGROUND OF THE INVENTION

The present invention relates to image display apparatus and, more particularly, to a head- or face-mounted image display apparatus that can be retained on the observer's head or face.

In recent years, image display apparatus, particularly head- or face-mounted image display apparatus, have been developed actively for the purpose of enabling the user to enjoy a wide-screen image personally.

There has heretofore been known a head-mounted image display apparatus in which an image displayed on an image display device, e.g. a liquid crystal display (LCD) or a CRT, is once formed in the air by a relay optical system, and then the image is led to an observer's eyeball through an ocular optical system including a semitransparent mirror and a concave mirror [for example, see Japanese Patent Application Unexamined Publication Numbers (hereinafter referred to as "JP(A)") 3-39925 and 7-151993]. There has also been known a head-mounted image display apparatus in which an image displayed on an image display device is once formed in the air by an optical system including a semitransparent mirror and a concave mirror, and then the image is led to an observer's eyeball through an ordinary ocular optical system [see Published Japanese Translation of PCT International Publication No. 10-504115].

Incidentally, the above-described image display apparatus, which has an optical system wherein a first image is formed by using a relay optical system and the first image is led to an observer's eyeball through an ocular optical system including a semitransparent mirror and a concave mirror, is superior to image display apparatus having no relay optical system in the following points:

① Aberrations produced in the ocular optical system can be corrected by the relay optical system.

② An image of a small LCD is formed as an enlarged image on an intermediate image plane by the relay optical system. This is equivalent to using a large LCD panel in combination with an ocular optical system including a semitransparent mirror and a concave mirror. Thus, a wide viewing field angle can be obtained even if a small LCD is used. To attain a wide viewing field angle with an image display apparatus using only an ocular optical system including a semitransparent mirror and a concave mirror, without using a relay optical system, it is necessary to shorten the focal length of the concave mirror to thereby increase the magnification. However, if the power of the concave mirror is made excessively strong, aberrations are aggravated.

Incidentally, JP(A) 7-333551 and 8-234137 propose a technique whereby the optical system of an image display apparatus can be made compact in size and light in weight while maintaining high optical performance (brightness, field angle, resolution, etc.) by using a decentered optical system.

SUMMARY OF THE INVENTION

In view of the above-described circumstances of the prior art, an object of the present invention is to provide an image display apparatus including a relay optical system that forms an intermediate image of an image display device, and an ocular optical system having a semitransparent mirror and a concave mirror, wherein a decentered optical system is used in the relay optical system to fold an optical path, thereby making the optical system even more compact, and further the intermediate image magnifying power of the relay optical system is increased to thereby realize a wide field angle while keeping the power of the concave mirror part of the ocular optical system at a small value.

To attain the above-described object, the present invention provides an image display apparatus having an image display device and a viewing optical system that leads an image formed by the image display device to the position of an observer's eyeball.

The viewing optical system has at least the following three surfaces. That is, the viewing optical system has an image source-side reflecting surface having a decentered curved surface configuration that gives a power to a light beam emitted from the image display device when the light beam is reflected by the decentered curved surface. The image source-side reflecting surface also has a rotationally asymmetric surface configuration that corrects decentration aberrations produced by reflection at the decentered curved surface. The viewing optical system further has a semitransparent reflecting surface with half-mirror coating that transmits or reflects the light beam reflected from the image source-side reflecting surface, and a concave reflecting surface that forms a folded optical path between the concave reflecting surface and the semitransparent reflecting surface. The concave reflecting surface has a concave surface directed toward the semitransparent reflecting surface. An enlarged intermediate image of the image displayed on the image display device is formed between the image source-side reflecting surface and the semitransparent reflecting surface.

In this case, the viewing optical system may have at least two surfaces, which are a first surface and a second surface that face each other across a medium having a refractive index larger than 1. The first surface is an entrance surface through which a light beam emitted from the image display device enters the medium. The second surface serves as the image source-side reflecting surface. The first and second surfaces are placed between the intermediate image and the image display device.

The viewing optical system may have a third surface that faces the first and second surfaces across the medium whose refractive index is larger than 1. The third surface is formed from at least a reflecting surface having a rotationally asymmetric curved surface configuration that gives a power to a light beam when reflecting it and corrects decentration aberrations. Moreover, the third surface is placed in an optical path between the first surface and the semitransparent reflecting surface.

The reasons for adopting the above-described arrangements in the present invention, together with the functions thereof, will be described below.

An image display apparatus according to the present invention has an image display device and a viewing optical system that leads an image formed by the image display device to the position of an observer's eyeball. The viewing optical system has at least the following three surfaces. That is, the viewing optical system has an image source-side reflecting surface having a decentered curved surface configuration that gives a power to a light beam emitted from the image display device when the light beam is reflected by the decentered curved surface. The image source-side reflecting surface also has a rotationally asymmetric surface configuration that corrects decentration aberrations produced by reflection at the decentered curved surface. The viewing optical system further has a semitransparent reflecting surface with half-mirror coating that transmits or reflects the light beam reflected by the image source-side reflecting surface, and a concave reflecting surface that forms a folded optical path between the concave reflecting surface and the semitransparent reflecting surface. The concave reflecting surface has a concave surface directed toward the semitransparent reflecting surface. The viewing optical system forms an enlarged intermediate image of the image of the image display device between the image source-side reflecting surface and the semitransparent reflecting surface. Thus, a part of the viewing optical system that acts as a relay optical system has at least the image source-side reflecting surface. Therefore, the optical path can be folded, and the relay optical system can be made more compact than the conventional relay optical system using an axially symmetric optical system. Furthermore, because the relay optical system enlarges the intermediate image while correcting aberrations, it is possible to realize a wide field angle while keeping the power of the concave reflecting surface at a small value. The concave reflecting surface forms an ocular optical system in combination with the semitransparent reflecting surface. In addition, because the image source-side reflecting surface, which is included in the relay optical system, has a decentered curved surface configuration and also a rotationally asymmetric surface configuration that corrects decentration aberrations produced by reflection at the decentered curved surface, aberration correction can be satisfactorily performed despite the use of a decentered optical system in the relay optical system.

In one form of the present invention, the relay optical system has at least two surfaces, which are a first surface and a second surface that face each other across a medium having a refractive index larger than 1. The first surface is an entrance surface through which a light beam emitted from the image display device enters the medium. The second surface serves as the image source-side reflecting surface. The first and second surfaces are placed between the intermediate image and the image display device. With this arrangement, the relay optical system can be made even more compact and corrected for aberrations even more reliably.

The following is a description of the merit of forming the relay optical system from such a decentered optical system, particularly an internally reflecting decentered prism.

A refracting optical element such as a lens is provided with a power by giving a curvature to an interface surface thereof. Accordingly, when rays are refracted at the interface surface of the lens, chromatic aberration unavoidably occurs according to chromatic dispersion characteristics of the refracting optical element. Consequently, the common practice is to add another refracting optical element for the purpose of correcting the chromatic aberration.

Meanwhile, a reflecting optical element such as a mirror or a prism produces no chromatic aberration in theory even when a reflecting surface thereof is provided with a power, and need not add another optical element only for the purpose of correcting chromatic aberration. Accordingly, an optical system using a reflecting optical element allows the number of constituent optical elements to be reduced from the viewpoint of chromatic aberration correction in comparison to an optical system using a refracting optical element.

At the same time, a reflecting optical system using a reflecting optical element allows the optical system itself to be compact in size in comparison to a refracting optical system because the optical path is folded in the reflecting optical system.

Reflecting surfaces require a high degree of accuracy for assembly and adjustment because they have high sensitivity to decentration errors in comparison to refracting surfaces. However, among reflecting optical elements, prisms, in which the positional relationship between surfaces is fixed, only need to control decentration as a single unit of prism and do not need high assembly accuracy and a large number of man-hours for adjustment as are needed for other reflecting optical elements.

Furthermore, a prism has an entrance surface and an exit surface, which are refracting surfaces, and a reflecting surface. Therefore, the degree of freedom for aberration correction is high in comparison to a mirror, which has only a reflecting surface. In particular, if the prism reflecting surface is assigned the greater part of the desired power to thereby reduce the powers of the entrance and exit surfaces, which are refracting surfaces, it is possible to reduce chromatic aberration to a very small quantity in comparison to refracting optical elements such as lenses while maintaining the degree of freedom for aberration correction at a high level in comparison to mirrors. Furthermore, the inside of a prism is filled with a transparent medium having a refractive index higher than that of air. Therefore, it is possible to obtain a longer optical path length than in the case of air. Accordingly, the use of a prism makes it possible to obtain an optical system that is thinner and more compact than those formed from lenses, mirrors and so forth, which are placed in the air.

In addition, a viewing optical system is required to exhibit favorable image-forming performance as far as the peripheral portions of the image field, not to mention the performance required for the center of the image field. Therefore, in the present invention, a single prism is used in a relay optical system that forms a viewing optical system as stated above. The prism includes at least a first surface through which a light beam emitted from the image display device enters the prism, and a second surface that reflects the light beam entering through the first surface. At least the reflecting surface has a rotationally asymmetric curved surface configuration that gives an optical power to a light beam and that corrects decentration aberrations, thereby enabling not only axial aberrations but also off-axis aberrations to be favorably corrected.

Adopting the above-described basic arrangement makes it possible to obtain a compact image display apparatus that has a smaller number of constituent optical elements than in the case of an optical system using a refracting optical system or a rotationally symmetric relay optical system and exhibits favorable performance throughout the image field, from the center to the periphery thereof.

When a light ray that passes through the center of the pupil and reaches the center of the display surface of the image display device is defined as an axial principal ray, it is desirable that at least one reflecting surface of the prism should be decentered with respect to the axial principal ray. If at least one reflecting surface is not decentered with respect to the axial principal ray, the axial principal ray travels along the same optical path when incident on and reflected from the reflecting surface, and thus the axial principal ray is intercepted in the optical system undesirably. As a result, an image is formed from only a light beam whose central portion is shaded. Consequently, the center of the image is unfavorably dark, or no image is formed in the center of the image field.

It is also possible to decenter a reflecting surface with a power with respect to the axial principal ray.

In the present invention, the image source-side reflecting surface, which forms the relay optical system, has a rotationally asymmetric curved surface configuration that gives an optical power to a light beam and that corrects decentration aberrations, as stated above. Such a surface configuration is favorable from the viewpoint of correcting decentration aberrations. The reason for this will be described below in detail.

First of all, a coordinate system used in the following description and rotationally asymmetric surfaces will be described.

An optical axis defined by a straight line along which the axial principal ray travels until it intersects the first surface of the optical system is defined as a Z-axis. An axis perpendicularly intersecting the Z-axis in the decentration plane of each surface constituting the optical system is defined as a Y-axis. An axis perpendicularly intersecting the optical axis and also perpendicularly intersecting the Y-axis is defined as an X-axis. Ray tracing will be described by backward ray tracing in which rays are traced from the pupil toward the image display device, as stated above.

In general, a spherical lens system comprising only a spherical lens is arranged such that aberrations produced by spherical surfaces, such as spherical aberration, coma and curvature of field, are corrected with some surfaces by canceling the aberrations with each other, thereby reducing aberrations as a whole.

On the other hand, rotationally symmetric aspherical surfaces and the like are used to correct aberrations favorably with a minimal number of surfaces. The reason for this is to reduce various aberrations that would be produced by spherical surfaces.

However, in a decentered optical system, rotationally asymmetric aberrations due to decentration cannot be corrected by a rotationally symmetric optical system. Rotationally asymmetric aberrations due to decentration include distortion, curvature of field, and astigmatic and comatic aberrations, which occur even on the axis.

First, rotationally asymmetric curvature of field will be described. For example, when rays from an infinitely distant object point are incident on a decentered concave mirror, the rays are reflected by the concave mirror to form an image. In this case, the back focal length from that portion of the concave mirror on which the rays strike to the image surface is a half the radius of curvature of the portion on which the rays strike in a case where the medium on the image side is air. Consequently, as shown in FIG. 16, an image surface tilted with respect to the axial principal ray is formed. It is impossible to correct such rotationally asymmetric curvature of field by a rotationally symmetric optical system.

To correct the tilted curvature of field by the concave mirror M itself, which is the source of the curvature of field, the concave mirror M is formed from a rotationally asymmetric surface, and, in this example, the concave mirror M is arranged such that the curvature is made strong (refracting power is increased) in the positive direction of the Y-axis, whereas the curvature is made weak (refracting power is reduced) in the negative direction of the Y-axis. By doing so, the tilted curvature of field can be corrected. It is also possible to obtain a flat image surface with a minimal number of constituent surfaces by placing a rotationally asymmetric surface having the same effect as that of the above-described arrangement in the optical system separately from the concave mirror M.

It is preferable that the rotationally asymmetric surface should be a rotationally asymmetric surface having no axis of rotational symmetry in the surface nor out of the surface. If the rotationally asymmetric surface has no axis of rotational symmetry in the surface nor out of the surface, the degree of freedom increases, and this is favorable for aberration correction.

Next, rotationally asymmetric astigmatism will be described.

A decentered concave mirror M produces astigmatism even for axial rays, as shown in FIG. 17, as in the case of the above. The astigmatism can be corrected by appropriately changing the curvatures in the X- and Y-axis directions of the rotationally asymmetric surface as in the case of the above.

Rotationally asymmetric coma will be described below.

A decentered concave mirror M produces coma even for axial rays, as shown in FIG. 18, as in the case of the above. The coma can be corrected by changing the tilt of the rotationally asymmetric surface according as the distance from the origin of the X-axis increases, and further appropriately changing the tilt of the surface according to the sign (positive or negative) of the Y-axis.

The image-forming optical system according to the present invention may also be arranged such that at least one of the above-described surfaces having a reflecting action is decentered with respect to the axial principal ray and has a rotationally asymmetric surface configuration and further has a power. By adopting such an arrangement, decentration aberrations produced as the result of giving a power to the reflecting surface can be corrected by the surface itself. In addition, the power of the refracting surfaces of the prism is reduced, and thus chromatic aberration produced in the prism can be minimized.

The rotationally asymmetric surface used in the present invention should preferably be a plane-symmetry free-form surface having only one plane of symmetry. Free-form surfaces used in the present invention are defined by the following equation (a). It should be noted that the Z-axis of the defining equation is the axis of a free-form surface.

$$Z = cr^2 / \left[1 + \sqrt{\{1 - (1+k)c^2 r^2\}}\right] + \sum_{j=2}^{66} C_j X^m Y^n \qquad (a)$$

In Eq. (a), the first term is a spherical surface term, and the second term is a free-form surface term.

In the spherical surface term:

c: the curvature at the vertex k: a conic constant $r = \sqrt{(X^2 + Y^2)}$

The free-form surface term is given by $$\sum_{j=2}^{66} C_j X^m Y^n = C_2 X + C_3 Y + C_4 X^2 + C_5 XY + C_6 Y^2 +$$
$$C_7 X^3 + C_8 X^2 Y + C_9 XY^2 + C_{10} Y^3 + C_{11} X^4 +$$
$$C_{12} X^3 Y + C_{13} X^2 Y^2 + C_{14} XY^3 + C_{15} Y^4 +$$
$$C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y + C_{24} X^4 Y^2 +$$

-continued $$C_{25}X^3Y^3 + C_{26}X^2Y^4 + C_{27}XY^5 + C_{28}Y^6 +$$
$$C_{29}X^7 + C_{30}X^6Y + C_{31}X^5Y^2 + C_{32}X^4Y^3 +$$
$$C_{33}X^3Y^4 + C_{34}X^2Y^5 + C_{35}XY^6 + C_{36}Y^7 \ldots$$

where $C_j$ (j is an integer of 2 or higher) are coefficients.

In general, the above-described free-form surface does not have planes of symmetry in both the XZ- and YZ-planes. In the present invention, however, a free-form surface having only one plane of symmetry parallel to the YZ-plane is obtained by making all terms with odd-numbered powers of X zero. For example, in the above defining equation (a), the coefficients of the terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, . . . are set equal to zero. By doing so, it is possible to obtain a free-form surface having only one plane of symmetry parallel to the YZ-plane.

A free-form surface having only one plane of symmetry parallel to the XZ-plane is obtained by making all terms with odd-numbered powers of Y zero. For example, in the above defining equation (a), the coefficients of the terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, . . . are set equal to zero. By doing so, it is possible to obtain a free-form surface having only one plane of symmetry parallel to the XZ-plane.

Furthermore, the direction of decentration is determined in correspondence to either of the directions of the above-described planes of symmetry. For example, with respect to the plane of symmetry parallel to the YZ-plane, the direction of decentration of the optical system is determined to be the Y-axis direction. With respect to the plane of symmetry parallel to the XZ-plane, the direction of decentration of the optical system is determined to be the X-axis direction. By doing so, rotationally asymmetric aberrations due to decentration can be corrected effectively, and at the same time, the productivity can be improved.

It should be noted that the above defining equation (a) is shown as merely an example, and that the feature of the present invention resides in that rotationally asymmetric aberrations due to decentration are corrected and, at the same time, the productivity is improved by using a rotationally asymmetric surface having only one plane of symmetry. Therefore, the same advantageous effect can be obtained for any other defining equation that expresses a rotationally asymmetric surface.

In a case where the relay optical system is formed from a prism that includes a first surface serving as an entrance surface and a second surface as an image source-side reflecting surface, as stated above, it is even more desirable to arrange the first surface in the form of a rotationally asymmetric curved surface configuration capable of assisting the correction of decentration aberrations produced by the second surface.

In a case where the relay optical system is formed from a decentered prism, it is desirable from the viewpoint of aberration correction that the prism should be arranged as follows. The prism is formed from at least three surfaces, which are a first surface, a second surface, and a third surface. The first surface is an entrance surface through which a light beam emitted from the image display device enters the prism medium. The second surface is a reflecting surface that reflects the light beam entering through the first surface. The third surface is a reflecting surface that reflects the light beam reflected by the second surface. Both the second and third surfaces are arranged in the form of a rotationally asymmetric curved surface configuration that gives an optical power to a light beam and corrects decentration aberrations.

The part of the viewing optical system that acts as an ocular optical system may be arranged such that a light beam from the image display device is passed through the semitransparent reflecting surface and then reflected by the concave reflecting surface, and the reflected light beam is reflected by the semitransparent reflecting surface. The ocular optical system part may also be arranged such that a light beam from the image display device is reflected by the semitransparent reflecting surface and then reflected by the concave reflecting surface, and the reflected light beam is passed through the semitransparent reflecting surface.

The concave reflecting surface in the ocular optical system part may be arranged in the form of a rotationally asymmetric curved surface configuration capable of correcting decentration aberrations produced in the entire viewing optical system. With this arrangement, aberration correction can be effected even more favorably.

In a case where the ocular optical system part is arranged such that a light beam from the image display device is reflected by the semitransparent reflecting surface and then reflected by the concave reflecting surface, and the reflected light beam is passed through the semitransparent reflecting surface, the concave reflecting surface may be formed from a surface having both reflecting and transmitting actions whereby a light from the image display device is reflected and, at the same time, light from the outside world is allowed to enter the ocular optical system part. With this arrangement, an image displayed on the image display device can be observed as an enlarged image, and the outside world can be observed selectively or superimposed on the displayed image.

In this case, it is desirable that the concave reflecting surface should be formed from a thin-walled member having two approximately parallel concave surfaces that face each other across a medium having a refractive index larger than 1 so as to correct aberrations produced when light from the outside world enters through the concave reflecting surface.

In this case, it is desirable that the thin-walled member, which forms the concave reflecting surface, should have a thickness in the range of from 0.1 millimeter to 6.0 millimeters. If the thickness is less than 0.1 millimeter, the thin-walled member becomes excessively thin. Consequently, the mass-productivity degrades, and the thin-walled member is likely to break when it is provided with half-mirror coating to realize a see-through function. If the thickness exceeds 6 millimeters, the thin-walled member becomes excessively thick, causing the weight to increase unfavorably.

In these cases, it is desirable to form the configurations of the two concave surfaces of the thin-walled member, which forms the concave reflecting surface, so that the amount of distortion introduced into a light beam passing through the concave reflecting surface is within 10% (desirably 5%) in a region extending radially from the center of the effective surface area of the concave surfaces to have a radius that is one third of the radius of the effective surface area. If the amount of distortion exceeds 10%, the observer is given an unfavorable impression when viewing the outside world. It is preferable to form the two concave surfaces of the thin-walled member so that the amount of distortion is within 5%. By doing so, the outside world can be observed even more beautifully.

The viewing optical system in the present invention may be arranged to have a first prism including at least the first surface and the second surface; the semitransparent reflecting surface placed separately from the first prism; and the concave reflecting surface placed separately from the first prism and the semitransparent reflecting surface.

The viewing optical system may be arranged to have a first prism including at least the first surface and the second surface, and a second prism having at least the semitransparent reflecting surface and the concave reflecting surface.

The viewing optical system may be formed from a prism including at least the first surface, the second surface, the semitransparent reflecting surface, and the concave reflecting surface.

It is desirable that the semitransparent reflecting surface should have a plane surface configuration. The semitransparent reflecting surface may have a curved surface configuration, as a matter of course.

It is desirable that at least one rotationally asymmetric curved surface of the viewing optical system in the present invention should be a plane-symmetry free-form surface having only one plane of symmetry.

It is preferable from a practical point of view that the image display apparatus according to the present invention should have the viewing optical system and a support member capable of retaining the viewing optical system on the head of an observer to lead a light beam from the viewing optical system to an eyeball of the observer.

Incidentally, the relay optical system part may be formed from a decentered prism as shown in numerical examples (described later). That is, in Examples 1 to 3, the relay optical system part is formed from a decentered prism that is independent of the semitransparent reflecting surface and the concave reflecting surface. The decentered prism has a first surface through which a light beam emitted from the image display device enters the prism, a second surface that reflects the light beam entering through the first surface, and a third surface that reflects the light beam reflected from the second surface. The optical path connecting the first and second surfaces and the optical path reflected from the third surface intersect each other in the prism. In Example 4, the relay optical system part is formed from a single decentered prism that includes the semitransparent reflecting surface and the concave reflecting surface. By using such a decentered prism, the relay optical system part can be formed in a compact structure. In such a prism configuration, the entrance pupil is positioned in the prism. Therefore, aberration correction can be made favorably by distributing the powers of the prism surfaces approximately in symmetry with respect to the pupil position.

Let us define the power of a decentered optical system such as that used in the present invention and the power of an optical surface. As shown in FIG. 19, when the direction of decentration of a decentered optical system S is taken in the Y-axis direction, a light ray which is parallel to the axial principal ray of the decentered optical system S and which has a small height d in the YZ-plane is made to enter the decentered optical system S from the object side thereof (from the exit pupil side in the backward ray tracing in the case of the present invention). The angle that is formed between that ray and the axial principal ray exiting from the decentered optical system S when the two rays are projected onto the YZ-plane is denoted by δy, and δy/d is defined as the power Py in the Y-axis direction of the decentered optical system S. Similarly, a light ray which is parallel to the axial principal ray of the decentered optical system S and which has a small height d in the X-axis direction, which is perpendicular to the YZ-plane, is made to enter the decentered optical system S from the object side thereof. The angle that is formed between that ray and the axial principal ray exiting from the decentered optical system S when the two rays are projected onto a plane perpendicularly intersecting the YZ-plane and containing the axial principal ray is denoted by δx, and δx/d is defined as the power Px in the X-axis direction of the decentered optical system S. The power Pyn in the Y-axis direction and power Pxn in the X-axis direction of a decentered optical surface n constituting the decentered optical system S are defined in the same way as the above.

Furthermore, the reciprocals of the above-described powers are defined as the focal length Fy in the Y-axis direction of the decentered optical system S, the focal length Fx in the X-axis direction of the decentered optical system S, the focal length Fyn in the Y-axis direction of the decentered optical surface n, and the focal length Fxn in the X-axis direction of the decentered optical surface n, respectively.

As has been stated above, the relay optical system part of the image display apparatus according to the present invention may be formed from a decentered prism having a first surface through which a light beam emitted from the image display device enters the prism, a second surface that reflects the light beam entering through the first surface, and a third surface that reflects the light beam reflected from the second surface. The optical path connecting the first and second surfaces and the optical path reflected from the third surface intersect each other in the prism. In this case, the absolute value of the power in the X-axis direction of the entire optical system is denoted by Px, and the absolute value of the power in the Y-axis direction of the entire optical system is denoted by Py. The surfaces of the decentered prism are denoted by S1, S2, S3 and S4, respectively, from the image display device side [there is no surface S4 in a case where the relay optical system part is formed from a single decentered prism that includes the semitransparent reflecting surface and the concave reflecting surface (Example 4)]. In addition, the powers of the surfaces S1 to S4 at positions where an axial principal ray that passes through the center of the exit pupil and reaches the center of the display surface of the image display device intersects the surfaces S1 to S4 are denoted by PxS1, PyS1, PxS2, PyS2, PxS3, PyS3, PxS4, and PyS4, respectively.

It is important to satisfy either of the following conditions:

$$-2.0 < PxS3/Px < 3.5 \tag{1}$$

$$-2.5 < PyS3/Py < 3.5 \tag{2}$$

These conditions specify the power of the surface S3 relative to the power of the entire optical system. If PxS3/Px or PyS3/Py is not larger than the lower limit, i.e. −2.0 or −2.5, the power of the surface S3 becomes negatively strong excessively, and decentration aberrations produced by this surface become impossible to correct by another surface. If PxS3/Px or PyS3/Py is not smaller than the upper limit, i.e. 3.5, the power of the surface S3 becomes positively strong excessively, and decentration aberrations produced by this surface become impossible to correct by another surface.

It is more desirable to satisfy either of the following conditions:

$$-0.5 < PxS3/Px < 2.5 \tag{1-1}$$

$$-1.5 < PyS3/Py < 2.5 \tag{2-1}$$

The meaning of the upper and lower limits of each of the conditions (1-1) and (2-1) is the same as the above.

It is even more desirable to satisfy either of the following conditions:

$$0.5 < PxS3/Px < 1.8 \tag{1-2}$$

$$-0.5 < PyS3/Py < 1.5 \tag{2-2}$$

The meaning of the upper and lower limits of each of the conditions (1-2) and (2-2) is the same as the above.

It is important to satisfy either of the following conditions:

$$-2.0 < PxS2/Px < 3.5 \quad (3)$$

$$-1.5 < PyS2/Py < 4.5 \quad (4)$$

These conditions specify the power of the surface S2 relative to the power of the entire optical system. If PxS2/Px or PyS2/Py is not larger than the lower limit, i.e. −2.0 or −1.5, the power of the surface S2 becomes negatively strong excessively, and decentration aberrations produced by this surface become impossible to correct by another surface. If PxS2/Px or PyS2/Py is not smaller than the upper limit, i.e. 3.5 or 4.5, the power of the surface S2 becomes positively strong excessively, and decentration aberrations produced by this surface become impossible to correct by another surface.

It is more desirable to satisfy either of the following conditions:

$$-1.0 < PxS2/Px < 2.5 \quad (3\text{-}1)$$

$$-0.5 < PyS2/Py < 3.5 \quad (4\text{-}1)$$

The meaning of the upper and lower limits of each of the conditions (3-1) and (4-1) is the same as the above.

It is even more desirable to satisfy either of the following conditions:

$$0.0 < PxS2/Px < 1.5 \quad (3\text{-}2)$$

$$0.5 < PyS2/Py < 2.5 \quad (4\text{-}2)$$

The meaning of the upper and lower limits of each of the conditions (3-2) and (4-2) is the same as the above.

As has been stated above, the relay optical system part of the image display apparatus according to the present invention may be formed from a decentered prism that is independent of the semitransparent reflecting surface and the concave reflecting surface (see Examples 1 to 3). The decentered prism has a first surface through which a light beam emitted from the image display device enters the prism, a second surface that reflects the light beam entering through the first surface, and a third surface that reflects the light beam reflected from the second surface. The optical path connecting the first and second surfaces and the optical path reflected from the third surface intersect each other in the prism. In this case, it is important to satisfy either of the following conditions:

$$-1.5 < PxS3/PxHP < 3.0 \quad (5)$$

$$-3.0 < PyS3/PyHP < 2.5 \quad (6)$$

where PxHP is the power in the X-axis direction of the decentered prism, and PyHP is the power in the Y-axis direction of the decentered prism.

These conditions specify the power of the surface S3 relative to the power of the decentered prism on the image display device side. If PxS3/PxHP or PyS3/PyHP is not larger than the lower limit, i.e. −1.5 or −3.0, the power of the surface S3 becomes negatively strong excessively, and decentration aberrations produced by this surface become impossible to correct by another surface. If PxS3/PxHP or PyS3/PyHP is not smaller than the upper limit, i.e. 3.0 or 2.5, the power of the surface S3 becomes positively strong excessively, and decentration aberrations produced by this surface become impossible to correct by another surface.

It is more desirable to satisfy either of the following conditions:

$$-0.5 < PxS3/PxHP < 2.0 \quad (5\text{-}1)$$

$$-2.0 < PyS3/PyHP < 1.5 \quad (6\text{-}1)$$

The meaning of the upper and lower limits of each of the conditions (5-1) and (6-1) is the same as the above.

It is even more desirable to satisfy either of the following conditions:

$$0.5 < PxS3/PxHP < 1.0 \quad (5\text{-}2)$$

$$-1.0 < PyS3/PyHP < 0.5 \quad (6\text{-}2)$$

The meaning of the upper and lower limits of each of the conditions (5-2) and (6-2) is the same as the above.

It is important to satisfy either of the following conditions:

$$-2.0 < PxS2/PxHP < 2.5 \quad (7)$$

$$-2.0 < PyS2/PyHP < 4.0 \quad (8)$$

These conditions specify the power of the surface S2 relative to the power of the decentered prism on the image display device side. If PxS2/PxHP or PyS2/PyHP is not larger than the lower limit, i.e. −2.0, the power of the surface S2 becomes negatively strong excessively, and decentration aberrations produced by this surface become impossible to correct by another surface. If PxS2/PxHP or PyS2/PyHP is not smaller than the upper limit, i.e. 2.5 or 4.0, the power of the surface S2 becomes positively strong excessively, and decentration aberrations produced by this surface become impossible to correct by another surface.

It is more desirable to satisfy either of the following conditions:

$$-1.0 < PxS2/PxHP < 1.5 \quad (7\text{-}1)$$

$$-1.0 < PyS2/PyHP < 3.0 \quad (8\text{-}1)$$

The meaning of the upper and lower limits of each of the conditions (7-1) and (8-1) is the same as the above.

It is even more desirable to satisfy either of the following conditions:

$$0.0 < PxS2/PxHP < 0.8 \quad (7\text{-}2)$$

$$0.0 < PyS2/PyHP < 2.0 \quad (8\text{-}2)$$

The meaning of the upper and lower limits of each of the conditions (7-2) and (8-2) is the same as the above.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
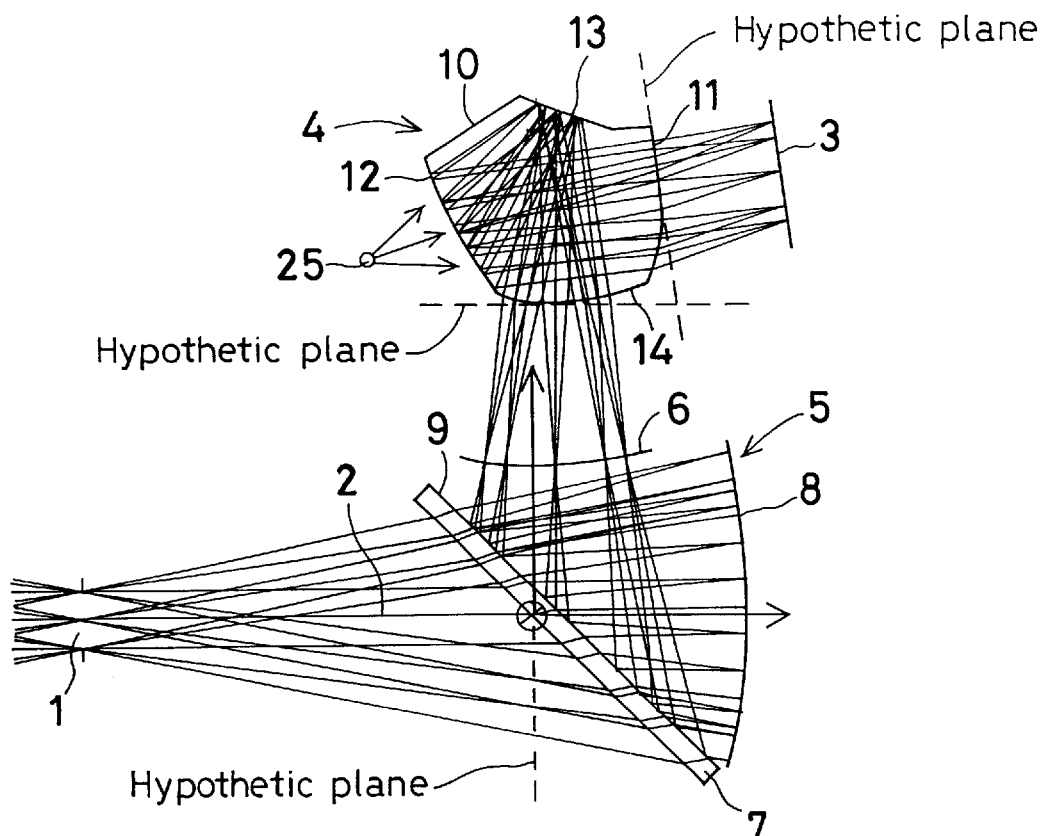
FIG. 1 is a ray path diagram showing an image display apparatus according to Example 1 of the present invention.

Specific Numerical Examples 1 to 4 of the present invention will be described below. In constituent parameters of each example (described later), as shown in FIG. 1, an axial principal ray 2 is defined by a ray passing through the center of an exit pupil 1 of an ocular optical system 5 and reaching the center of an image plane (image display device) 3 in the backward ray tracing. A hypothetic plane is taken in the plane extending through the intersection between the axial principal ray 2 and the entrance surface (exit surface in the forward ray tracing) of the ocular optical system 5, which faces the exit pupil 1. The hypothetic plane is perpendicular to the axial principal ray 2 entering the entrance surface. More specifically, in Examples 1 and 2, the above-mentioned entrance surface of the ocular optical system 5 is a surface of a semitransparent mirror 7 on the side thereof that faces the exit pupil 1. In Example 3, the entrance surface is an exit surface 23 of a prism 20. In Example 4, the entrance surface is an exit surface 15 of a prism 10. Another hypothetic plane is taken in the plane extending through the intersection between the axial principal ray 2 and the exit surface (entrance surface in the forward ray tracing) of a relay optical system 4 at right angles to the axial principal ray 2 exiting from the exit surface. More specifically, in Examples 1 to 3, the above-mentioned exit surface is a first surface 11 of a first prism 10. In Example 4, the exit surface is a first surface 11 of the prism 10. Still another hypothetic plane is taken in the plane extending through the intersection between the axial principal ray 2 and the entrance surface (exit surface in the forward ray tracing) of a prism that forms the relay optical system 4 at right angles to the axial principal ray 2 entering the entrance surface. More specifically, in Examples 1 to 3, the above-mentioned entrance surface is a fourth surface 14 of the first prism 10. In Example 4, the entrance surface is a semitransparent reflecting surface 9 in the prism 10. The intersection of each hypothetic plane and the associated optical surface is defined as the origin for this optical surface and decentered optical surfaces present between it and the subsequent hypothetic plane (the image plane in the case of the final hypothetic plane). In the case of a hypothetic plane determined with respect to the intersection of an entrance surface, the direction in which the axial principal ray 2 enters the entrance surface is defined as a Z-axis direction. In the case of a hypothetic plane determined with respect to the intersection of an exit surface, the direction in which the axial principal ray 2 exits from the exit surface is defined as a Z-axis direction. The direction in which the axial principal ray 2 travels is defined as a positive direction of the Z-axis. A plane containing the Z-axis and the center of the image plane is defined as a YZ-plane. An axis extending through the origin at right angles to the YZ-plane is defined as an X-axis. The direction in which the X-axis extends from the obverse side toward the reverse side of the plane of the figure is defined as a positive direction of the X-axis. An axis that forms a right-handed orthogonal coordinate system in combination with the X- and Z-axes is defined as a Y-axis. FIG. 1 shows the hypothetic planes and a coordinate system concerning the first hypothetic plane determined with respect to the intersection of the surface of the semitransparent mirror 7 on the side thereof that faces the exit pupil 1. Illustration of the hypothetic planes and the coordinate system is omitted in FIGS. 2 to 4, which show Examples 2 to 4, respectively.

In Example 1 to 4, the decentration of each surface is made in the YZ-plane, and the one and only plane of symmetry of each rotationally asymmetric free-form surface is the YZ-plane.

Regarding decentered surfaces, each surface is given displacements in the X-, Y- and Z-axis directions (X, Y and Z, respectively) of the vertex position of the surface from the origin of the associated coordinate system, and tilt angles (degrees) of the center axis of the surface [the Z-axis of the above equation (a) in regard to free-form surfaces] with respect to the X-, Y- and Z-axes ($\alpha$, $\beta$ and $\gamma$, respectively). In this case, positive $\alpha$ and $\beta$ mean counterclockwise rotation relative to the positive directions of the corresponding axes, and positive $\gamma$ means clockwise rotation relative to the positive direction of the Z-axis.

Among optical surfaces constituting the optical system in each example, a specific surface (including a hypothetic plane) and a surface subsequent thereto are given a surface separation when these surfaces form a coaxial optical system. In addition, the refractive index and Abbe's number of each medium are given according to the conventional method.

The configuration of each free-form surface used in the present invention is defined by the above equation (a). The Z-axis of the defining equation is the axis of the free-form surface.

In the constituent parameters (shown later), those terms concerning free-form surfaces for which no data is shown are zero. The refractive index is expressed by the refractive index for the spectral d-line (wavelength: 587.56 nanometers). Lengths are given in millimeters.

Free-form surfaces may also be defined by Zernike polynomials. That is, the configuration of a free-form surface may be defined by the following equation (b). The Z-axis of the defining equation (b) is the axis of Zernike polynomial. A rotationally asymmetric surface is defined by polar coordinates of the height of the Z-axis with respect to the XY-plane. In the equation (b), A is the distance from the Z-axis in the XY-plane, and R is the azimuth angle about the Z-axis, which is expressed by the angle of rotation measured from the Z-axis.

$$x = R \times \cos(A) \quad (b)$$

$$y = R \times \sin(A)$$

$$Z = D_2 + D_3 R\cos(A) + D_4 R\sin(A) + D_5 R^2 \cos(2A) +$$
$$D_6(R^2 - 1) + D_7 R^2 \sin(2A) + D_8 R^3 \cos(3A) +$$
$$D_9(3R^3 - 2R)\cos(A) + D_{10}(3R^3 - 2R)\sin(A) +$$
$$D_{11} R^3 \sin(3A) + D_{12} R^4 \cos(4A) +$$
$$D_{13}(4R^4 - 3R^2)\cos(2A) + D_{14}(6R^4 - 6R^2 + 1) +$$
$$D_{15}(4R^4 - 3R^2)\sin(2A) + D_{16} R^4 \sin(4A) +$$
$$D_{17} R^5 \cos(5A) + D_{18}(5R^5 - 4R^3)\cos(3A) +$$
$$D_{19}(10R^5 - 12R^3 + 3R)\cos(A) +$$
$$D_{20}(10R^5 - 12R^3 + 3R)\sin(A) +$$
$$D_{21}(5R^5 - 4R^3)\sin(3A) + D_{22} R^5 \sin(5A) +$$
$$D_{23} R^6 \cos(6A) + D_{24}(6R^6 - 5R^4)\cos(4A) +$$
$$D_{25}(15R^6 - 20R^4 + 6R^2)\cos(2A) +$$
$$D_{26}(20R^6 - 30R^4 + 12R^2 - 1) +$$
$$D_{27}(15R^6 - 20R^4 + 6R^2)\sin(2A) +$$
$$D_{28}(6R^6 - 5R^4)\sin(4A) + D_{29} R^6 \sin(6A) \ldots$$

In the above equation, to design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ . . . should be used.

Other examples of surfaces usable in the present invention are expressed by the following defining equation (c):

$$Z = \Sigma\Sigma C_{nm} XY$$

Assuming that k=7 (polynomial of degree 7), for example, a free-form surface is expressed by an expanded form of the above equation as follows:

$$Z = C_2 + C_3 y + C_4|x| + C_5 y^2 + C_6 y|x| + C_7 x^2 + \quad (c)$$
$$C_8 y^3 + C_9 y^2|x| + C_{10} y x^2 + C_{11}|x^3| + C_{12} y^4 +$$
$$C_{13} y^3|x| + C_{14} y^2 x^2 + C_{15} y|x^3| + C_{16} x^4 + C_{17} y^5 +$$
$$C_{18} y^4|x| + C_{19} y^3 x^2 + C_{20} y^2|x^3| + C_{21} y x^4 + C_{22}|x^5| +$$
$$C_{23} y^6 + C_{24} y^5|x| + C_{25} y^4 x^2 + C_{26} y^3|x^3| + C_{27} y^2 x^4 +$$
$$C_{28} y|x^5| + C_{29} x^6 + C_{30} y^7 + C_{31} y^6|x| + C_{32} y^5 x^2 +$$
$$C_{33} y^4|x^3| + C_{34} y^3 x^4 + C_{35} y^2|x^5| + C_{36} y x^6 +$$
$$C_{37}|x^7|$$

Although in the examples of the present invention the surface configuration is expressed by a free-form surface using the above equation (a), it should be noted that the same advantageous effect can be obtained by using the above equation (b) or (c).

FIGS. 1 to 4 are sectional views of Examples 1 to 4, respectively, taken along the YZ-plane containing the optical axis.

In all Examples 1 to 4, the horizontal field angle is 30°, and the image display device is assumed to be a 0.47-inch LCD. Examples 1 to 4 each have a prism 10 on the side thereof closer to an image display device 3. The prism 10 has a first surface 11 and a second surface 12 that reflects a light beam entering through the first surface 11. The prism 10 further has a third surface 13 that reflects the light beam reflected from the second surface 12. The optical path connecting the first surface 11 and the second surface 12 and the optical path reflected from the third surface 13 intersect each other in the prism 10. The first to third surfaces 11 to 13 are formed by using plane-symmetry free-form surfaces, respectively.

As shown in FIG. 1, an image display apparatus according to Example 1 has a first prism 10 that forms a relay optical system 4, and an ocular optical system 5. The first prism 10 has four optical surfaces 11 to 14. The space lying between the four surfaces 11 to 14 is filled with a transparent medium having a refractive index larger than 1. The ocular optical system 5 is formed from a semitransparent mirror 7 having a semitransparent reflecting surface 9, and a concave mirror 8. In the backward ray tracing, the axial principal ray 2 passing through an exit pupil 1 enters the semitransparent mirror 7, which forms the ocular optical system 5, through a plane surface of the semitransparent mirror 7 that is reverse to the semitransparent reflecting surface 9. The incident axial principal ray 2 is reflected back by the concave mirror 8 and then reflected by the semitransparent reflecting surface 9 of the semitransparent mirror 7. Then, the reflected axial principal ray 2 enters the first prism 10 through the fourth surface 14, which is a transmitting surface. The axial principal ray 2 is reflected by the third surface 13, which is a reflecting surface, and then reflected by the second surface 12, which is a reflecting surface. The reflected axial principal ray 2 exits from the first prism 10 through the first surface 11, which has only a transmitting action, and reaches the display surface of the image display device 3, which is placed at the position of the image plane, to form an image thereon. A curved intermediate image surface 6 is formed between the semitransparent reflecting surface 9 of the semitransparent mirror 7 and the fourth surface 14 of the first prism 10.

In actuality, display light emitted from the image display device 3 travels along an optical path reverse to the above and is projected as an enlarged image into an eyeball of an observer whose pupil is placed at the position of the exit pupil 1. It should be noted that either a transmissive LCD or a reflective LCD may be used as the image display device 3. When a reflective LCD is used, it is desirable to illuminate the reflective LCD by using a semitransparent reflecting surface as the second surface 12 or third surface 13 of the first prism 10 and placing a light source 25 in front of the second surface 12 or the third surface 13, which is a semitransparent reflecting surface. With this arrangement, light from the light source 25 is made to enter the first prism 10 through the semitransparent reflecting surface and reflected by the second surface 12 (the light is not reflected when it enters through the second surface 12 as illustrated in the figure). Then, the light exits from the first surface 11 to illuminate the reflective LCD. The same is the case with the following examples. In this example, the outside world can be seen through the concave mirror 8 by using a semitransparent reflecting surface as the concave mirror 8.

In this example, the concave mirror 8 is a spherical mirror. The focal length in the X-axis direction of the entire optical system is 17.15 millimeters, and the focal length in the Y-axis direction of the entire optical system is 17.79 millimeters. The pupil diameter is 4.0 millimeters.

Figure 2:
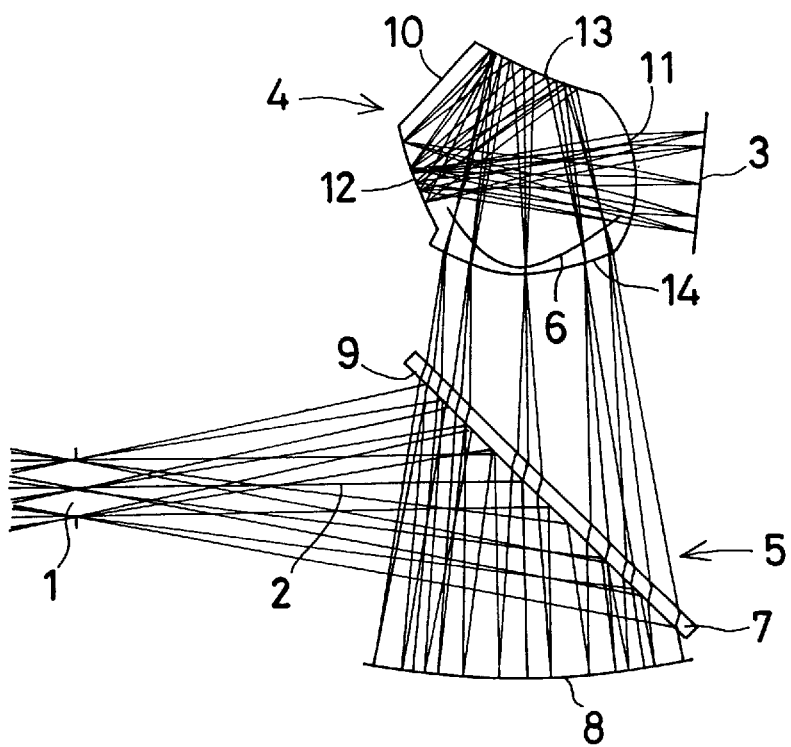
FIG. 2 is a ray path diagram showing an image display apparatus according to Example 2 of the present invention.

As shown in FIG. 2, an image display apparatus according to Example 2 has a first prism 10 that forms a relay optical system 4, and an ocular optical system 5. The first prism 10 is formed from four optical surfaces 11 to 14. The space lying between the four surfaces 11 to 14 is filled with a transparent medium having a refractive index larger than 1. The ocular optical system 5 is formed from a semitransparent mirror 7 having a semitransparent reflecting surface 9, and a concave mirror 8. In the backward ray tracing, an axial principal ray 2 passing through an exit pupil 1 enters the ocular optical system 5 from the semitransparent reflecting surface side of the semitransparent mirror 7. The axial principal ray 2 is reflected by the semitransparent mirror 7 and then reflected back by the concave mirror 8. The reflected axial principal ray 2 passes through the semitransparent mirror 7 and enters the first prism 10 through the fourth surface 14, which is a transmitting surface. Then, the axial principal ray 2 is reflected by the third surface 13, which is a reflecting surface, and then reflected by the second surface 12, which is a reflecting surface. The reflected axial principal ray 2 exits from the first prism 10 through the first surface 11, which has only a transmitting action, and reaches the display surface of the image display device 3, which is placed at the position of the image plane, to form an image thereon. In this example, a curved intermediate image surface 6 is formed between the fourth surface 14 and third surface 13 in the first prism 10.

In actuality, display light emitted from the image display device 3 travels along an optical path reverse to the above and is projected as an enlarged image into an eyeball of an observer whose pupil is placed at the position of the exit pupil 1. In this example, the outside world can be seen through the semitransparent reflecting surface 9 without using an additional optical element because there is only the semitransparent reflecting surface 9 in front of the exit pupil 1.

In this example, the concave mirror 8 is a curved mirror having a free-form surface configuration. The focal length in the X-axis direction of the entire optical system is 17.30 millimeters, and the focal length in the Y-axis direction of the entire optical system is 17.33 millimeters. The pupil diameter is 4.0 millimeters.

Figure 3:
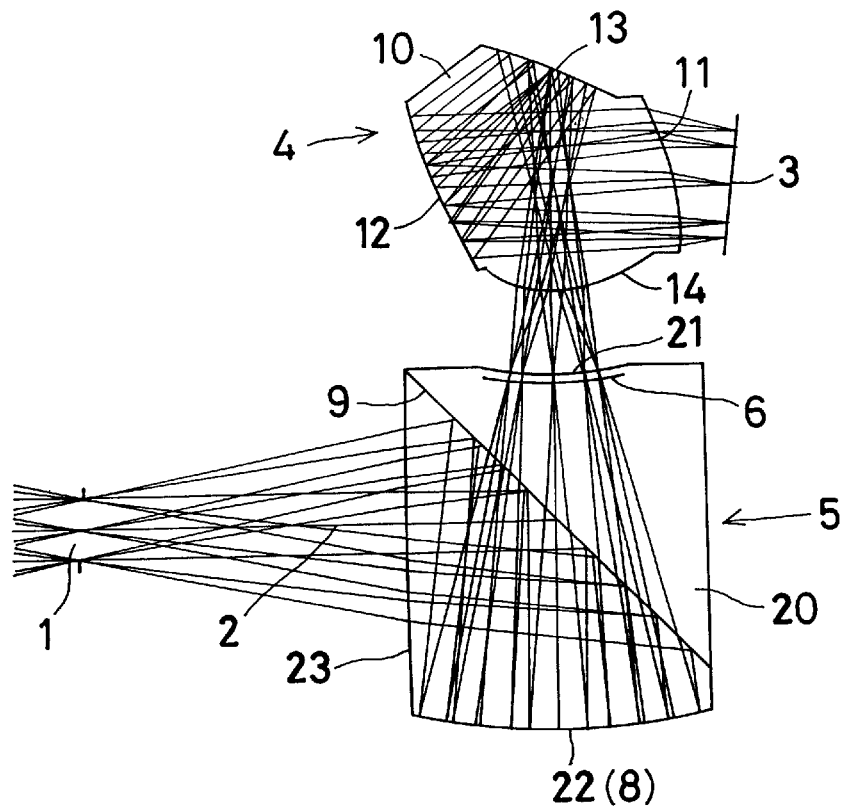
FIG. 3 is a ray path diagram showing an image display apparatus according to Example 3 of the present invention.

As shown in FIG. 3, an image display apparatus according to Example 3 has a first prism 10 that forms a relay optical system 4, and a second prism 20 that forms an ocular optical system 5. The first prism 10 is formed from four optical surfaces 11 to 14. The space lying between the four surfaces 11 to 14 is filled with a transparent medium having a refractive index larger than 1. The second prism 20 has a semitransparent reflecting surface 9 placed in the prism 20. A concave mirror 22 (8) is arranged in the form of a back-coated mirror of the prism 20. The second prism 20 further has an entrance surface 21 and an exit surface 23. In the backward ray tracing, an axial principal ray 2 passing through an exit pupil 1 enters the second prism 20 through the exit surface 23. The axial principal ray 2 is reflected by the semitransparent reflecting surface 9 and then reflected back by the concave mirror 22 (8). The reflected axial principal ray 2 passes through the semitransparent reflecting surface 9 and exits from the second prism 20 through the entrance surface 21. Then, the axial principal ray 2 enters the first prism 10 through the fourth surface 14, which is a transmitting surface. The axial principal ray 2 is reflected by the third surface 13, which is a reflecting surface, and then reflected by the second surface 12, which is a reflecting surface. The reflected axial principal ray 2 exits from the first prism 10 through the first surface 11, which has only a transmitting action, and reaches the display surface of the image display device 3, which is placed at the position of the image plane, to form an image thereon. In this example, a curved intermediate image surface 6 is formed in the vicinity of the entrance surface 21 in the second prism 20.

In actuality, display light emitted from the image display device 3 travels along an optical path reverse to the above and is projected as an enlarged image into an eyeball of an observer whose pupil is placed at the position of the exit pupil 1. In this example, the entrance surface 21 and concave mirror 22 (8) of the second prism 20 are formed from spherical surfaces. The focal length in the X-axis direction of the entire optical system is 18.76 millimeters, and the focal length in the Y-axis direction of the entire optical system is 18.41 millimeters. The pupil diameter is 4.0 millimeters.

Figure 4:
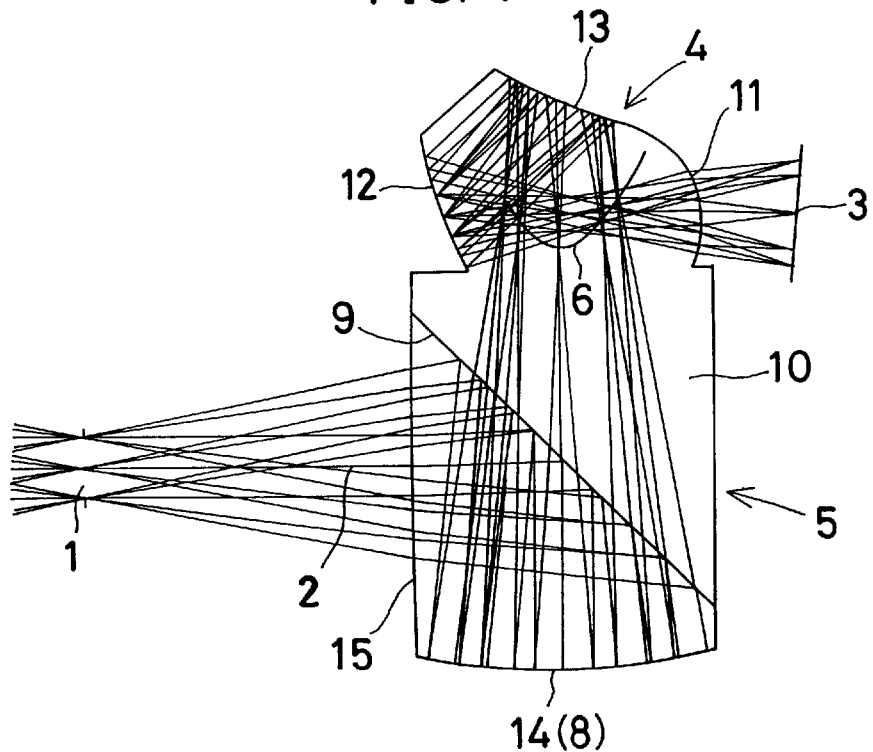
FIG. 4 is a ray path diagram showing an image display apparatus according to Example 4 of the present invention.

As shown in FIG. 4, an image display apparatus according to Example 4 has a relay optical system 4 and an ocular optical system 5, which are formed from a single prism 10. The prism 10 has five optical surfaces 11 to 15 and a semitransparent reflecting surface 9 that is placed in the prism 10. The space lying between the five surfaces 11 to 15 is filled with a transparent medium having a refractive index larger than 1. In the backward ray tracing, an axial principal ray 2 passing through an exit pupil 1 enters the prism 10 through the fifth surface 15 and is reflected by the semitransparent reflecting surface 9. The reflected axial principal ray 2 is reflected back by the concave mirror 8, which is the fourth surface 14. The reflected axial principal ray 2 passes through the semitransparent reflecting surface 9 and is reflected by the third surface 13, which is a reflecting surface, and further reflected by the second surface 12, which is a reflecting surface. Then, the reflected axial principal ray 2 exits from the prism 10 through the first surface 11, which has only a transmitting action, and reaches the display surface of the image display device 3, which is placed at the position of the image plane, to form an image thereon. In this example, a curved intermediate image surface 6 is formed in the prism 10 at a position between the semitransparent reflecting surface 9 and the third surface 13.

In actuality, display light emitted from the image display device 3 travels along an optical path reverse to the above and is projected as an enlarged image into an eyeball of an observer whose pupil is placed at the position of the exit pupil 1. In this example, the first to fourth surfaces 11 to 14 are formed from free-form surfaces. The focal length in the X-axis direction of the entire optical system is 17.79 millimeters, and the focal length in the Y-axis direction of the entire optical system is 18.18 millimeters. The pupil diameter is 4.0 millimeters.

Constituent parameters in the foregoing Examples 1 to 4 are shown below. In the tables below: "FFS" denotes a free-form surface; "HRP" denotes a hypothetic plane; and "RS" denotes a reflecting surface.

EXAMPLE 1

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | 32.00 | | | |
| 2 | ∞ (HRP1) | | | | |
| 3 | ∞ | | (1) | 1.4922 | 57.5 |
| 4 | ∞ | | (2) | | |
| 5 | −48.16 (RS) | | (3) | | |
| 6 | ∞ (RS) | | (2) | | |
| 7 | ∞ (HRP2) | | (4) | | |
| 8 | FFS① | | (5) | 1.4922 | 57.5 |
| 9 | FFS② (RS) | | (6) | 1.4922 | 57.5 |
| 10 | FFS③ (RS) | | (7) | 1.4922 | 57.5 |
| 11 | FFS④ | | (8) | | |
| 12 | ∞ (HRP3) | 8.46 | (9) | | |
| Image plane | ∞ | | | | |

FFS①

$C_4\ 1.1235 \times 10^{-2}$   $C_6\ 5.2235 \times 10^{-2}$   $C_8\ -4.9368 \times 10^{-3}$
$C_{10}\ 3.1015 \times 10^{-3}$   $C_{11}\ 1.0181 \times 10^{-4}$   $C_{13}\ 3.0334 \times 10^{-5}$
$C_{15}\ -2.9591 \times 10^{-5}$

FFS②

$C_4\ -7.0629 \times 10^{-3}$   $C_6\ 5.9878 \times 10^{-3}$   $C_8\ -1.2169 \times 10^{-3}$
$C_{10}\ 1.5230 \times 10^{-3}$   $C_{11}\ 3.3560 \times 10^{-5}$   $C_{13}\ -8.2285 \times 10^{-5}$
$C_{15}\ 2.0974 \times 10^{-4}$

FFS③

$C_4\ 8.1996 \times 10^{-3}$   $C_6\ 1.4581 \times 10^{-2}$   $C_8\ -8.8947 \times 10^{-4}$
$C_{10}\ 5.4462 \times 10^{-4}$   $C_{11}\ -4.4237 \times 10^{-5}$   $C_{13}\ -9.5349 \times 10^{-6}$
$C_{15}\ 1.4762 \times 10^{-5}$

FFS④

$C_4\ -5.4275 \times 10^{-2}$   $C_6\ -2.8406 \times 10^{-2}$   $C_8\ -6.3344 \times 10^{-3}$
$C_{10}\ 4.1841 \times 10^{-3}$   $C_{11}\ 1.2388 \times 10^{-4}$   $C_{13}\ 2.2282 \times 10^{-4}$
$C_{15}\ 3.3460 \times 10^{-4}$ Displacement and tilt(1)

| X | 0.00 | Y | 0.00 | Z | 0.00 |
| α | 45.00 | β | 0.00 | γ | 0.00 |

Displacement and tilt(2)

| X | 0.00 | Y | 0.49 | Z | 1.63 |
| α | 45.00 | β | 0.00 | γ | 0.00 |

Displacement and tilt(3)

| X | 0.00 | Y | 0.49 | Z | 15.50 |
| α | 0.00 | β | 0.00 | γ | 0.00 |

Displacement and tilt(4)

| X | 0.00 | Y | 21.19 | Z | 1.63 |
| α | 90.00 | β | 0.00 | γ | 0.00 |

Displacement and tilt(5)

| X | 0.00 | Y | 0.00 | Z | 0.00 |
| α | 0.00 | β | 0.00 | γ | 0.00 |

Displacement and tilt(6)

| X | 0.00 | Y | 0.00 | Z | 13.58 |
| α | −20.75 | β | 0.00 | γ | 0.00 |

Displacement and tilt(7)

| X | 0.00 | Y | 7.10 | Z | 5.55 |
| α | −61.49 | β | 0.00 | γ | 0.00 |

Displacement and tilt(8)

| X | 0.00 | Y | −7.48 | Z | 7.73 |
| α | −83.04 | β | 0.00 | γ | 0.00 |

Displacement and tilt(9)

| X | 0.00 | Y | −7.48 | Z | 7.73 |
| α | −80.73 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | 32.00 | | | |
| 2 | ∞ (HRP1) | | | | |
| 3 | ∞ (RS) | | (1) | | |
| 4 | FFS① (RS) | | (2) | | |
| 5 | ∞ | | (1) | 1.4922 | 57.5 |
| 6 | ∞ | | (3) | | |
| 7 | ∞ (HRP2) | | (4) | | |
| 8 | FFS② | | (5) | 1.4922 | 57.5 |
| 9 | FFS③ (RS) | | (6) | 1.4922 | 57.5 |
| 10 | FFS④ (RS) | | (7) | 1.4922 | 57.5 |
| 11 | FFS⑤ | | (8) | | |
| 12 | ∞ (HRP3) | 4.37 | (9) | | |
| Image plane | ∞ | | | | |

FFS①

$C_4\ 1.2949 \times 10^{-2}$   $C_6\ 8.7943 \times 10^{-3}$   $C_8\ -2.8166 \times 10^{-5}$
$C_{11}\ 1.5791 \times 10^{-7}$   $C_{13}\ 1.8422 \times 10^{-6}$   $C_{15}\ -1.1847 \times 10^{-6}$

FFS②

$C_4\ 4.8593 \times 10^{-3}$   $C_6\ 3.8587 \times 10^{-2}$   $C_8\ -1.3058 \times 10^{-3}$
$C_{10}\ 9.3848 \times 10^{-4}$   $C_{11}\ 1.3998 \times 10^{-4}$   $C_{13}\ 1.2985 \times 10^{-4}$
$C_{15}\ 1.4469 \times 10^{-4}$

FFS③

$C_4\ -1.0713 \times 10^{-2}$   $C_6\ 9.4423 \times 10^{-3}$   $C_8\ 1.4411 \times 10^{-5}$
$C_{10}\ 7.5087 \times 10^{-4}$   $C_{11}\ 7.7474 \times 10^{-6}$   $C_{13}\ 5.1807 \times 10^{-5}$
$C_{15}\ 6.6119 \times 10^{-5}$

FFS④

$C_4\ 1.0709 \times 10^{-2}$   $C_6\ 2.0989 \times 10^{-2}$   $C_8\ -1.1792 \times 10^{-4}$
$C_{10}\ 1.1751 \times 10^{-4}$   $C_{11}\ 4.5784 \times 10^{-6}$   $C_{13}\ 1.7026 \times 10^{-5}$
$C_{15}\ 2.1826 \times 10^{-5}$

FFS⑤

$C_4\ 2.7360 \times 10^{-3}$   $C_6\ -5.3650 \times 10^{-2}$   $C_8\ -6.4859 \times 10^{-4}$
$C_{10}\ -2.3854 \times 10^{-3}$   $C_{11}\ -2.5665 \times 10^{-4}$   $C_{13}\ 3.1764 \times 10^{-4}$
$C_{15}\ -4.8135 \times 10^{-4}$ Displacement and tilt(1)

| X | 0.00 | Y | 0.00 | Z | 0.00 |
| α | 45.00 | β | 0.00 | γ | 0.00 |

Displacement and tilt(2)

| X | 0.00 | Y | −13.87 | Z | 0.00 |
| α | 90.00 | β | 0.00 | γ | 0.00 |

Displacement and tilt(3)

| X | 0.00 | Y | 1.63 | Z | 0.49 |
| α | 45.00 | β | 0.00 | γ | 0.00 |

Displacement and tilt(4)

| X | 0.00 | Y | 14.59 | Z | 0.49 |
| α | 90.00 | β | 0.00 | γ | 0.00 |

-continued

| | | Displacement and tilt(5) | | | | |
|---|---|---|---|---|---|---|
| X | 0.00 | Y | 0.00 | Z | 0.00 | |
| α | 0.00 | β | 0.00 | γ | 0.00 | |
| | | Displacement and tilt(6) | | | | |
| X | 0.00 | Y | 0.00 | Z | 14.74 | |
| α | −24.87 | β | 0.00 | γ | 0.00 | |
| | | Displacement and tilt(7) | | | | |
| X | 0.00 | Y | 8.19 | Z | 7.81 | |
| α | −71.75 | β | 0.00 | γ | 0.00 | |
| | | Displacement and tilt(8) | | | | |
| X | 0.00 | Y | −7.97 | Z | 6.75 | |
| α | −90.43 | β | 0.00 | γ | 0.00 | |
| | | Displacement and tilt(9) | | | | |
| X | 0.00 | Y | −7.97 | Z | 6.75 | |
| α | −95.39 | β | 0.00 | γ | 0.00 | |

EXAMPLE 3

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | 22.00 | | | |
| 2 | ∞ (HRP1) | | | | |
| 3 | ∞ | | (1) | 1.4922 | 57.5 |
| 4 | ∞ (RS) | | (2) | 1.4922 | 57.5 |
| 5 | 46.16 | | (3) | 1.4922 | 57.5 |
| 6 | ∞ | | (2) | 1.4922 | 57.5 |
| 7 | 21.44 | | (4) | | |
| 8 | ∞ (HRP2) | | (5) | | |
| 9 | FFS① | | (6) | 1.4922 | 57.5 |
| 10 | FFS② (RS) | | (7) | 1.4922 | 57.5 |
| 11 | FFS③ (RS) | | (8) | 1.4922 | 57.5 |
| 12 | FFS④ | | (9) | | |
| 13 | ∞ (HRP3) | 3.75 | (10) | | |
| Image plane | ∞ | | | | |

FFS①

$C_4\ 2.5605 \times 10^{-2}$  $C_6\ 6.9971 \times 10^{-2}$  $C_8\ 2.7542 \times 10^{-3}$
$C_{10}\ 2.3554 \times 10^{-3}$  $C_{11}\ -1.0259 \times 10^{-4}$  $C_{13}\ 4.0110 \times 10^{-4}$
$C_{15}\ -6.7103 \times 10^{-5}$

FFS②

$C_4\ -1.3050 \times 10^{-2}$  $C_6\ 9.2644 \times 10^{-3}$  $C_8\ 2.0857 \times 10^{-4}$
$C_{10}\ 1.2339 \times 10^{-4}$  $C_{11}\ -1.0853 \times 10^{-5}$  $C_{13}\ -5.7038 \times 10^{-6}$
$C_{15}\ 1.4138 \times 10^{-5}$

FFS③

$C_4\ 1.0040 \times 10^{-2}$  $C_6\ 8.1423 \times 10^{-3}$  $C_8\ -5.2562 \times 10^{-5}$
$C_{10}\ -1.1967 \times 10^{-4}$  $C_{11}\ -1.4043 \times 10^{-5}$  $C_{13}\ -1.0513 \times 10^{-5}$
$C_{15}\ -1.2592 \times 10^{-6}$

FFS④

$C_4\ 2.0698 \times 10^{-2}$  $C_6\ -3.1565 \times 10^{-2}$  $C_8\ -1.4175 \times 10^{-3}$
$C_{10}\ 1.6290 \times 10^{-3}$  $C_{11}\ -4.0580 \times 10^{-5}$  $C_{13}\ 2.1474 \times 10^{-4}$
$C_{15}\ -1.1738 \times 10^{-4}$

| | | Displacement and tilt(1) | | | | |
|---|---|---|---|---|---|---|
| X | 0.00 | Y | 0.00 | Z | 0.00 | |
| α | 0.00 | β | 0.00 | γ | 0.00 | |
| | | Displacement and tilt(2) | | | | |
| X | 0.00 | Y | 0.00 | Z | 10.00 | |
| α | 45.00 | β | 0.00 | γ | 0.00 | |
| | | Displacement and tilt(3) | | | | |
| X | 0.00 | Y | −13.87 | Z | 10.00 | |
| α | 90.00 | β | 0.00 | γ | 0.00 | |
| | | Displacement and tilt(4) | | | | |
| X | 0.00 | Y | 9.50 | Z | 10.00 | |
| α | 90.00 | β | 0.00 | γ | 0.00 | |
| | | Displacement and tilt(5) | | | | |
| X | 0.00 | Y | 15.13 | Z | 10.00 | |
| α | 90.00 | β | 0.00 | γ | 0.00 | |
| | | Displacement and tilt(6) | | | | |
| X | 0.00 | Y | 0.00 | Z | 0.00 | |
| α | 0.00 | β | 0.00 | γ | 0.00 | |
| | | Displacement and tilt(7) | | | | |
| X | 0.00 | Y | 0.00 | Z | 14.74 | |
| α | −23.00 | β | 0.00 | γ | 0.00 | |
| | | Displacement and tilt(8) | | | | |
| X | 0.00 | Y | 7.71 | Z | 7.30 | |
| α | −68.00 | β | 0.00 | γ | 0.00 | |
| | | Displacement and tilt(9) | | | | |
| X | 0.00 | Y | −8.37 | Z | 7.30 | |
| α | −76.67 | β | 0.00 | γ | 0.00 | |
| | | Displacement and tilt(10) | | | | |
| X | 0.00 | Y | −8.37 | Z | 7.30 | |
| α | −96.79 | β | 0.00 | γ | 0.00 | |

EXAMPLE 4

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | 22.00 | | | |
| 2 | ∞ (HRP1) | | | | |
| 3 | ∞ | | (1) | 1.4922 | 57.5 |
| 4 | ∞ (RS) | | (2) | 1.4922 | 57.5 |
| 5 | FFS① (RS) | | (3) | 1.4922 | 57.5 |
| 6 | ∞ | | (2) | 1.4922 | 57.5 |
| 7 | ∞(HRP2) | | (4) | 1.4922 | 57.5 |
| 8 | FFS② (RS) | | (5) | 1.4922 | 57.5 |
| 9 | FFS③ (RS) | | (6) | 1.4922 | 57.5 |
| 10 | FFS④ | | (7) | | |
| 11 | ∞ (HRP 3) | 6.27 | (8) | | |
| Image plane | ∞ | | | | |

FFS①

$C_4\ 1.2759 \times 10^{-2}$  $C_6\ 8.6811 \times 10^{-3}$  $C_8\ -2.3027 \times 10^{-5}$
$C_{10}\ 4.2348 \times 10^{-6}$  $C_{11}\ 4.7429 \times 10^{-7}$  $C_{13}\ 3.6744 \times 10^{-6}$
$C_{15}\ -1.9230 \times 10^{-6}$

FFS②

$C_4\ -1.4396 \times 10^{-2}$  $C_6\ 3.0583 \times 10^{-3}$  $C_8\ 2.2655 \times 10^{-4}$
$C_{10}\ 3.0158 \times 10^{-4}$  $C_{11}\ 1.2388 \times 10^{-5}$  $C_{13}\ -1.5280 \times 10^{-5}$
$C_{15}\ 8.0358 \times 10^{-5}$

FFS③

$C_4\ 9.8336 \times 10^{-3}$  $C_6\ 1.8822 \times 10^{-2}$  $C_8\ -4.1156 \times 10^{-5}$
$C_{10}\ 1.9563 \times 10^{-5}$  $C_{11}\ 3.5163 \times 10^{-6}$  $C_{13}\ -2.7404 \times 10^{-6}$
$C_{15}\ 3.0271 \times 10^{-5}$

FFS④

$C_4\ -1.6959 \times 10^{-2}$  $C_6\ -6.1766 \times 10^{-2}$  $C_8\ 4.1156 \times 10^{-4}$
$C_{10}\ 2.5521 \times 10^{-4}$  $C_{11}\ 2.0350 \times 10^{-6}$  $C_{13}\ 5.3092 \times 10^{-4}$
$C_{15}\ -1.3544 \times 10^{-3}$ -continued

| | Displacement and tilt(1) | | | | |
|---|---|---|---|---|---|
| X | 0.00 | Y | 0.00 | Z | 0.00 |
| α | 0.00 | β | 0.00 | γ | 0.00 |
| | Displacement and tilt(2) | | | | |
| X | 0.00 | Y | 0.00 | Z | 10.00 |
| α | 45.00 | β | 0.00 | γ | 0.00 |
| | Displacement and tilt(3) | | | | |
| X | 0.00 | Y | −13.87 | Z | 10.00 |
| α | 90.00 | β | 0.00 | γ | 0.00 |
| | Displacement and tilt(4) | | | | |
| X | 0.00 | Y | 0.00 | Z | 0.00 |
| α | 90.00 | β | 0.00 | γ | 0.00 |
| | Displacement and tilt(5) | | | | |
| X | 0.00 | Y | 0.00 | Z | 24.13 |
| α | −23.10 | β | 0.00 | γ | 0.00 |
| | Displacement and tilt(6) | | | | |
| X | 0.00 | Y | 7.74 | Z | 16.71 |
| α | −68.27 | β | 0.00 | γ | 0.00 |
| | Displacement and tilt(7) | | | | |
| X | 0.00 | Y | −9.69 | Z | 16.61 |
| α | −83.41 | β | 0.00 | γ | 0.00 |
| | Displacement and tilt(8) | | | | |
| X | 0.00 | Y | −9.69 | Z | 16.61 |
| α | −93.79 | β | 0.00 | γ | 0.00 |

Figure 5:
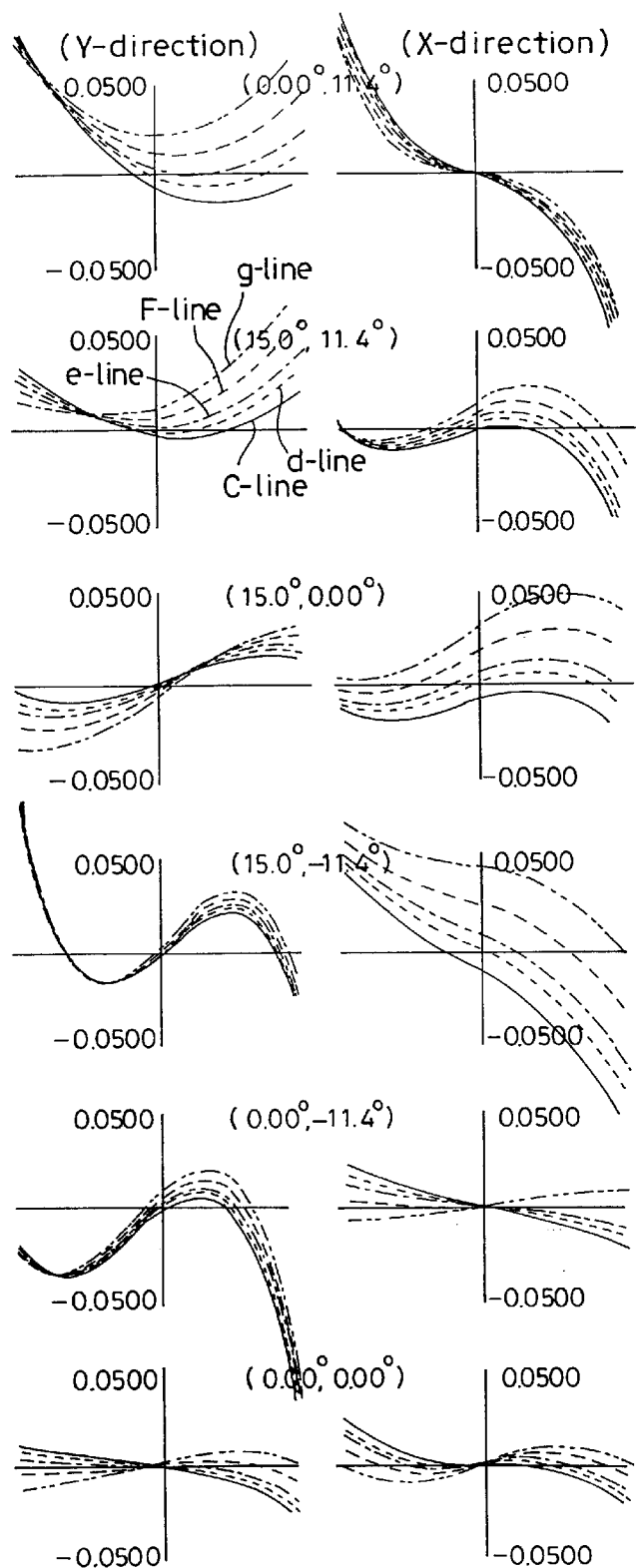
FIG. 5 is an aberrational diagram showing lateral aberrations in Example 1.

FIG. 5 is an aberrational diagram showing lateral aberrations in the above-described Example 1. In the diagram showing lateral aberrations, the numerals in the parentheses denote [horizontal (X-direction) field angle, vertical (Y-direction) field angle], and lateral aberrations at the field angles are shown.

The values concerning the conditions (1) to (8) in the above-described Examples 1 to 4 are as follows:

| | Example 1 | Example 2 | Example 3 | Example 4 |
|---|---|---|---|---|
| (1) | 0.7231 | 1.0890 | 1.4614 | 1.5291 |
| (2) | −0.6359 | −0.9768 | 1.0184 | −0.3319 |
| (3) | 0.0215 | 1.0886 | 1.1243 | 1.0445 |
| (4) | 1.5486 | 2.1712 | 0.8950 | 2.0426 |
| (5) | 0.6546 | 0.6935 | 0.7362 | — |
| (6) | −0.6940 | −0.8133 | 0.1562 | — |
| (7) | 0.0194 | 0.6933 | 0.5664 | — |
| (8) | 1.6899 | 1.8078 | 0.1373 | — |

In the foregoing Examples 1 to 4 of the present invention, the relay optical system 4 of the viewing optical system in the image display apparatus is formed by using a decentered prism 10 that has four optical surfaces 11 to 14. The space lying between the four surfaces 11 to 14 is filled with a transparent medium having a refractive index larger than 1. More specifically, the prism 10 has a first surface 11 through which a light beam from an image display device 3 enters the prism 10, a second surface 12 that reflects the light beam entering through the first surface 11, a third surface 13 that reflects the light beam reflected from the second surface 12, and a fourth surface 14 through which the light beam reflected from the third surface 13 exits from the prism 10. The optical path connecting the first surface 11 and the second surface 12 and the optical path reflected from the third surface 13 intersect each other in the prism 10 (in Example 4 also, it is possible to say that the above-described prism 10 is integrated with a prism that forms an ocular optical system 5). However, the relay optical system 4 is not necessarily limited to the above-described optical system and decentered prism but may be formed by using any of various decentered reflecting image-forming optical systems. Examples in which various decentered reflecting image-forming optical systems are used as a relay optical system 4 will be described below with reference to FIGS. 6 to 11.

Figure 6:
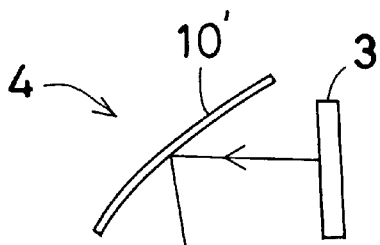
FIG. 6 is a diagram illustrating a modification of a relay optical system in the image display apparatus according to the present invention.

In FIG. 6, a decentered concave mirror 10' is used as a relay optical system 4. A light beam from an image display device 3 is reflected by the concave mirror 10' to form an intermediate image in an intermediate image plane 6. Then, the image displayed on the image display device 3 is projected as an enlarged image by an ocular optical system 5 into an eyeball E of an observer whose pupil is placed at the position of the exit pupil. In FIG. 6, the ocular optical system 5 has a concave mirror 8 placed in front of a semitransparent mirror 7 as in the case of FIG. 1. However, the arrangement of the ocular optical system 5 is not necessarily limited thereto. The ocular optical system 5 may be arranged as shown in Examples 2 to 4. That is, the concave mirror 8 may be placed outside the visual field of the observer's eyeball E. Alternatively, the semitransparent mirror 7 and the concave mirror 8 may be integrated into a prism. The same shall apply to the following examples, which are shown in FIG. 7 to 11.

Figure 7:
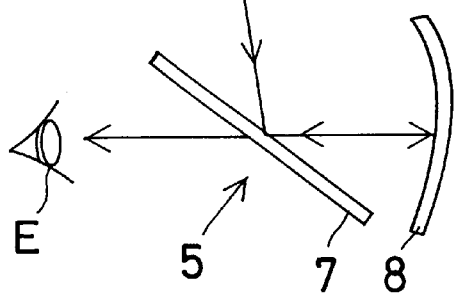
FIG. 7 is a diagram illustrating another modification of a relay optical system in the image display apparatus according to the present invention.

In FIG. 7, a decentered prism 10 having a first surface 11, a second surface 12 and a third surface 13 is used as a relay optical system 4. A light beam from an image display device 3 enters the prism 10 through the first surface 11 and is reflected by the second surface 12 so as to exit from the prism 10 through the third surface 13. Then, the image displayed on the image display device 3 is projected as an enlarged image by an ocular optical system 5 into an eyeball E of an observer whose pupil is placed at the position of the exit pupil.

Figure 8:
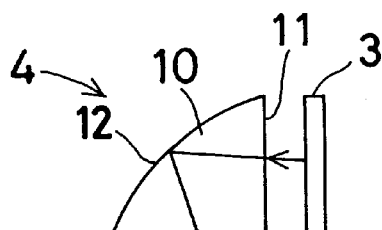
FIG. 8 is a diagram illustrating another modification of a relay optical system in the image display apparatus according to the present invention.

In FIG. 8, a decentered prism 10 having a first surface 11, a second surface 12 and a third surface 13 is used as a relay optical system 4. A light beam from an image display device 3 enters the prism 10 through the first surface 11 and is totally reflected by the second surface 12. Then, the reflected light beam is reflected by the third surface 13 so as to exit from the prism 10 through the second surface 12. Then, the image displayed on the image display device 3 is projected as an enlarged image by an ocular optical system 5 into an eyeball E of an observer whose pupil is placed at the position of the exit pupil.

Figure 9:
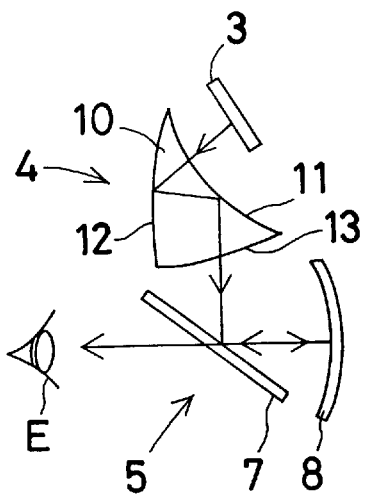
FIG. 9 is a diagram illustrating another modification of a relay optical system in the image display apparatus according to the present invention.

In FIG. 9, a decentered prism 10 having a first surface 11, a second surface 12 and a third surface 13 is used as a relay optical system 4. A light beam from an image display device 3 enters the prism 10 through the first surface 11 and is reflected by the second surface 12. The reflected light beam is totally reflected by the first surface 11 so as to exit from the prism 10 through the third surface 13. Then, the image displayed on the image display device 3 is projected as an enlarged image by an ocular optical system 5 into an eyeball E of an observer whose pupil is placed at the position of the exit pupil.

Figure 10:
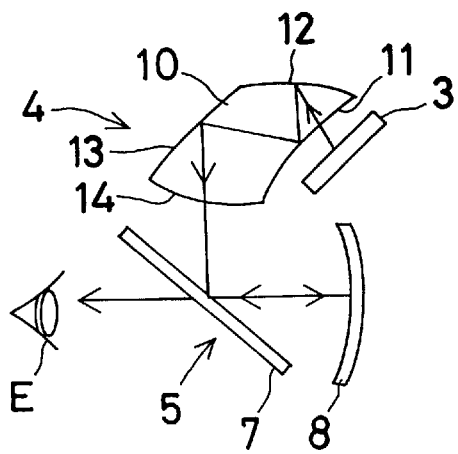
FIG. 10 is a diagram illustrating another modification of a relay optical system in the image display apparatus according to the present invention.

In FIG. 10, a decentered prism 10 having a first surface 11, a second surface 12, a third surface 13 and a fourth surface 14 is used as a relay optical system 4. A light beam from an image display device 3 enters the prism 10 through the first surface 11 and is reflected by the second surface 12. The reflected light beam is totally reflected by the first surface 11 and then reflected by the third surface 13 so as to form a Z-shaped optical path. Then, the reflected light beam exits from the prism 10 through the fourth surface 14. Then, the image displayed on the image display device 3 is projected as an enlarged image by an ocular optical system 5 into an eyeball E of an observer whose pupil is placed at the position of the exit pupil.

Figure 11:
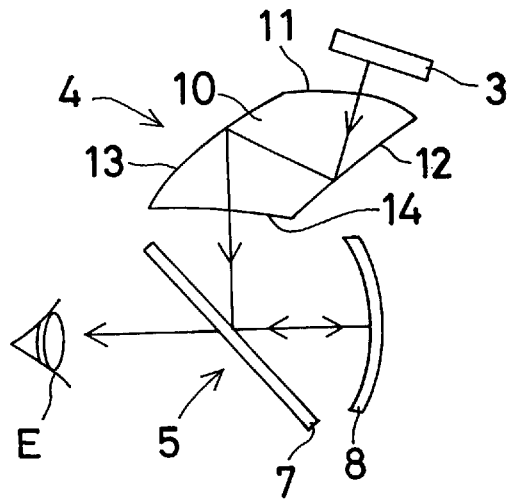
FIG. 11 is a diagram illustrating another modification of a relay optical system in the image display apparatus according to the present invention.

In FIG. 11, a decentered prism 10 having a first surface 11, a second surface 12, a third surface 13 and a fourth surface 14 is used as a relay optical system 4. A light beam from an image display device 3 enters the prism 10 through the first surface 11 and is reflected by the second surface 12 and further reflected by the third surface 13 so as to form a Z-shaped optical path. Then, the reflected light beam exits from the prism 10 through the fourth surface 14. Then, the image displayed on the image display device 3 is projected as an enlarged image by an ocular optical system 5 into an eyeball E of an observer whose pupil is placed at the position of the exit pupil.

Figure 12:
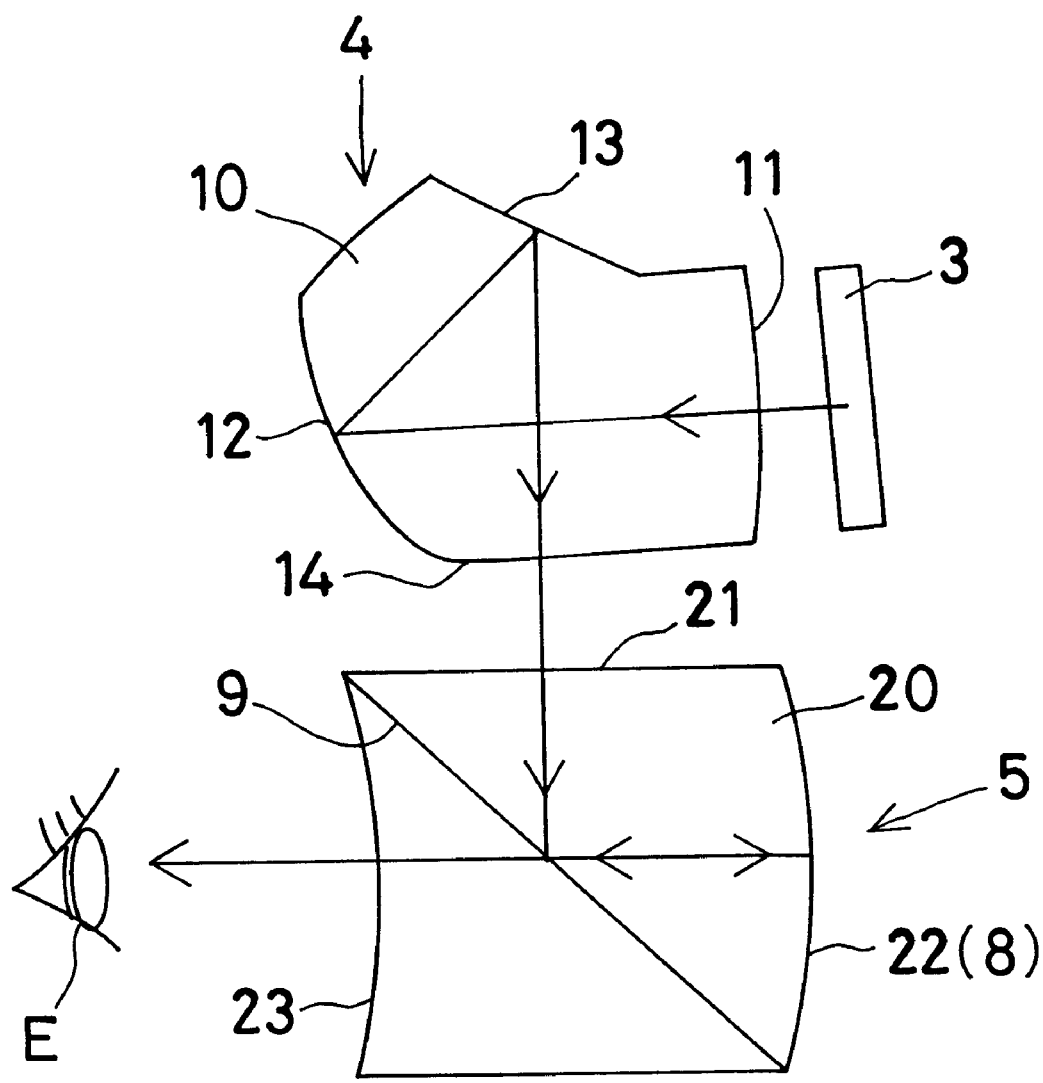
FIG. 12 is a diagram for describing the configurations of a semitransparent concave mirror and an exit surface in one form of an ocular optical system in the image display apparatus according to the present invention.

As shown in FIG. 12 by way of example, the ocular optical system 5 may be formed from a second prism 20 having an entrance surface 21 through which a light beam from a relay optical system 4 enters the prism 20, a semitransparent reflecting surface 9 placed in the prism 20, a semitransparent concave mirror 22 (8), which is a back-coated mirror placed in front of the semitransparent reflecting surface 9, and an exit surface 23. The light beam entering through the entrance surface 21 is reflected by the semitransparent reflecting surface 9 and then reflected by the semitransparent concave mirror 22 (8). The reflected light beam passes through the semitransparent reflecting surface 9 and exits from the prism 20 through the exit surface 23, thereby displaying the image displayed on the image display device 3 as an enlarged image. In addition, the outside world can be seen through the semitransparent concave mirror 22 (8) by external light that enters the prism 20 through the semitransparent concave mirror 22 (8), traverses the prism 20 and exits from the exit surface 23. In this case, it is desirable that the semitransparent concave mirror 22 (8) and exit surface 23 of the second prism 20 should be formed from parallel curved surfaces that are approximately identical with each other. In this case, it is desirable to form the configurations of these curved surfaces so that the amount of distortion introduced into an external light beam that passes through the two surfaces is within 10% in a region extending radially from the center of the effective surface area of these surfaces to have a radius that is one third of the radius of the effective surface area. In other words, it is desirable to form the curved surface configurations so that the amount of distortion produced in a region extending radially from the center of the effective surface area of these surfaces to have a radius that is one third of the radius of the effective surface area is within 10%.

Incidentally, an image display apparatus for a single eye can be formed by preparing one set of image display apparatus arranged as stated above. It is also possible to form an image display apparatus for two eyes by preparing a pair of such image display apparatuses for observer's left and right eyes and supporting them apart from each other by the interpupillary distance, i.e. the distance between the two eyes. Thus, it is possible to form a stationary or portable image display apparatus that enables observation with a single eye or two eyes.

Figure 13:
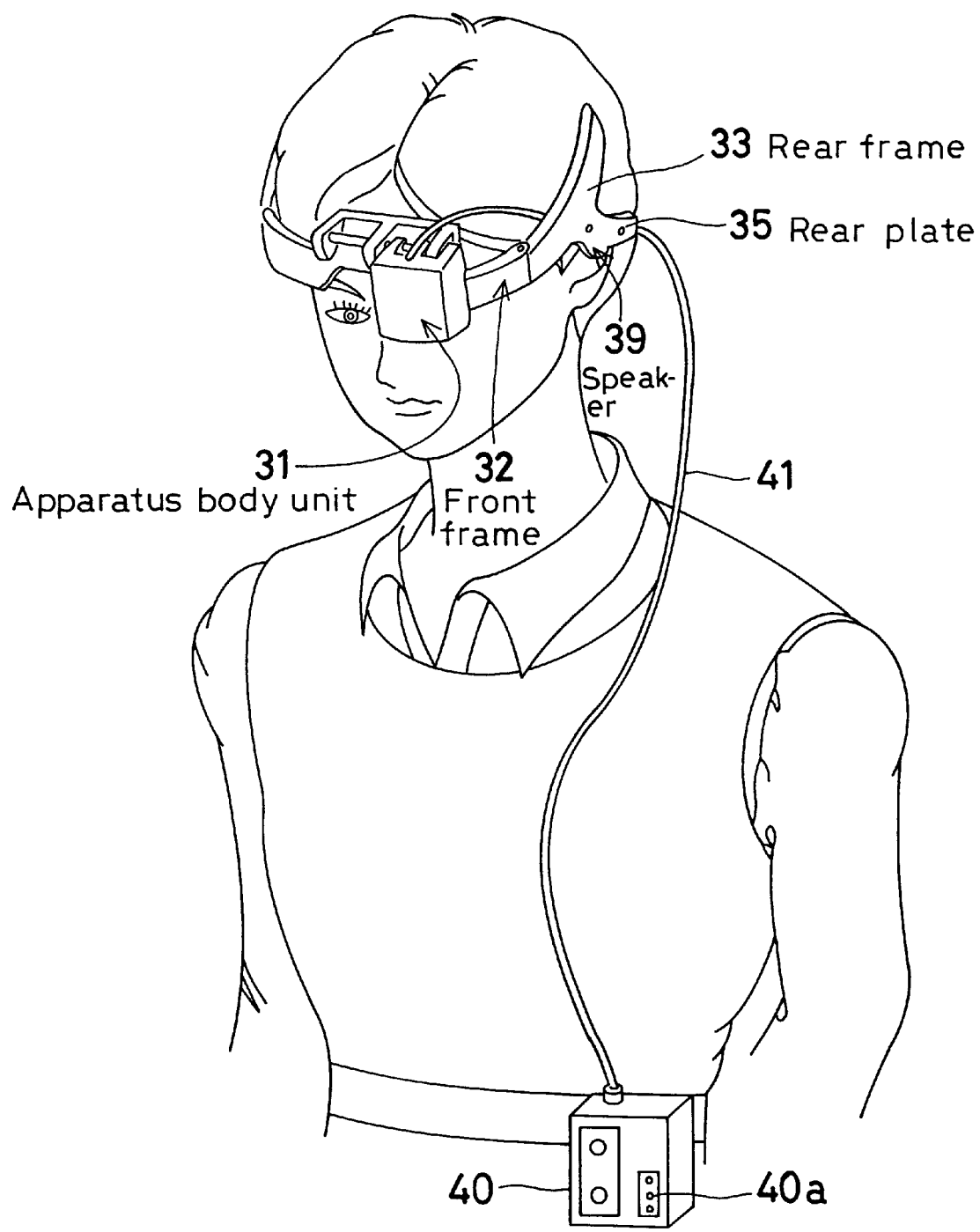
FIG. 13 is a diagram showing a head-mounted image display apparatus for a single eye according to the present invention in a state where it is fitted on an observer's head.
Figure 14:
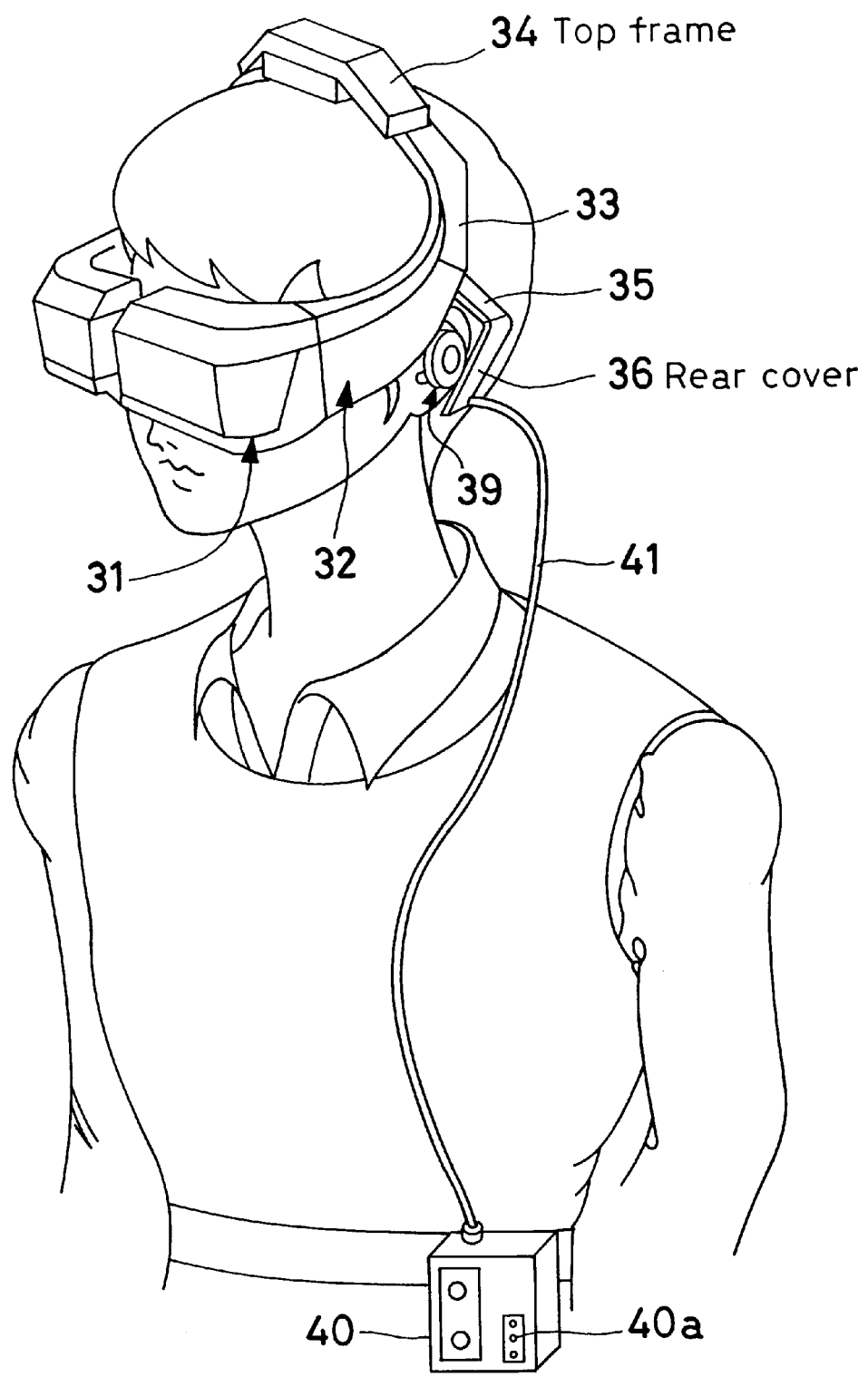
FIG. 14 is a diagram showing a head-mounted image display apparatus for both eyes according to the present invention in a state where it is fitted on an observer's head.
Figure 15:
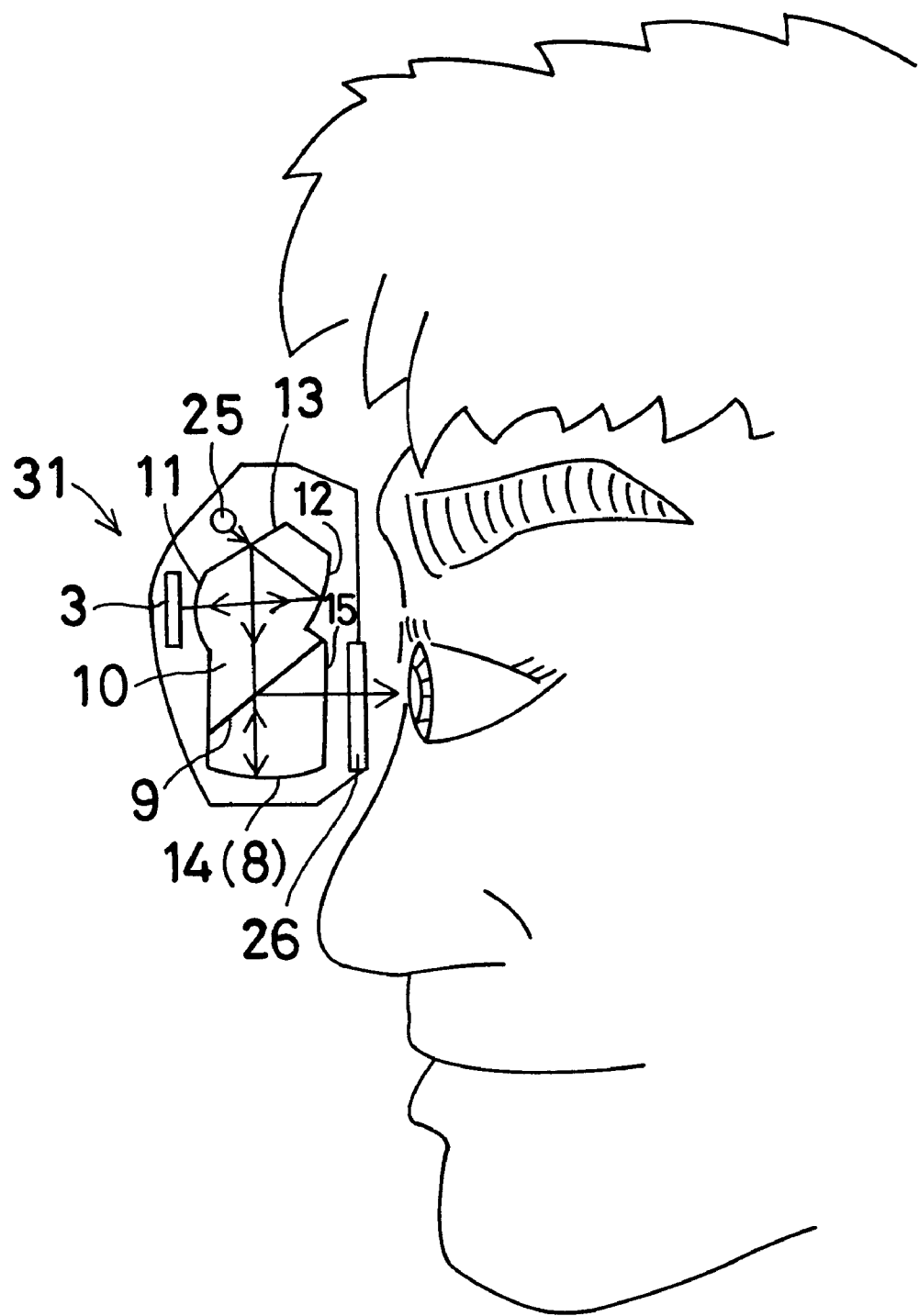
FIG. 15 is a sectional view of the head-mounted image display apparatus as shown in FIGS. 13 and 14.
Figure 16:
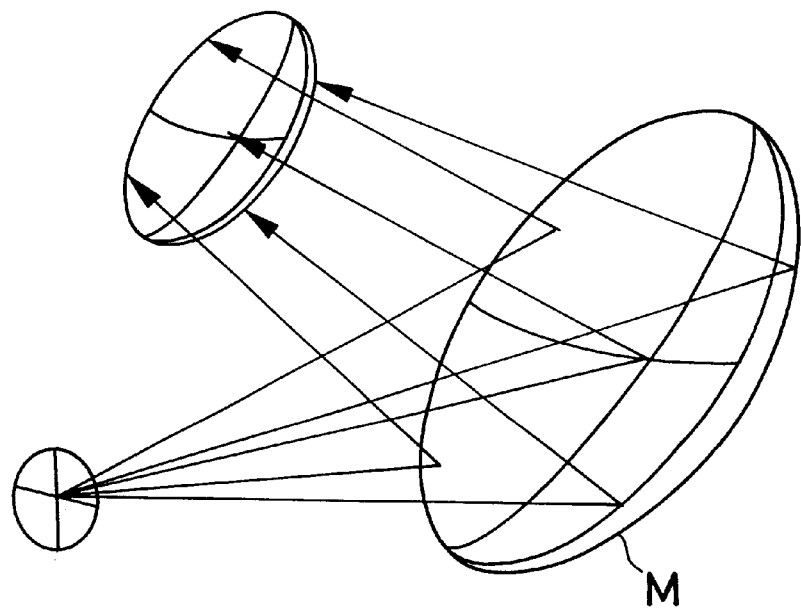
FIG. 16 is a conceptual view for describing curvature of field produced by a decentered reflecting surface.
Figure 17:
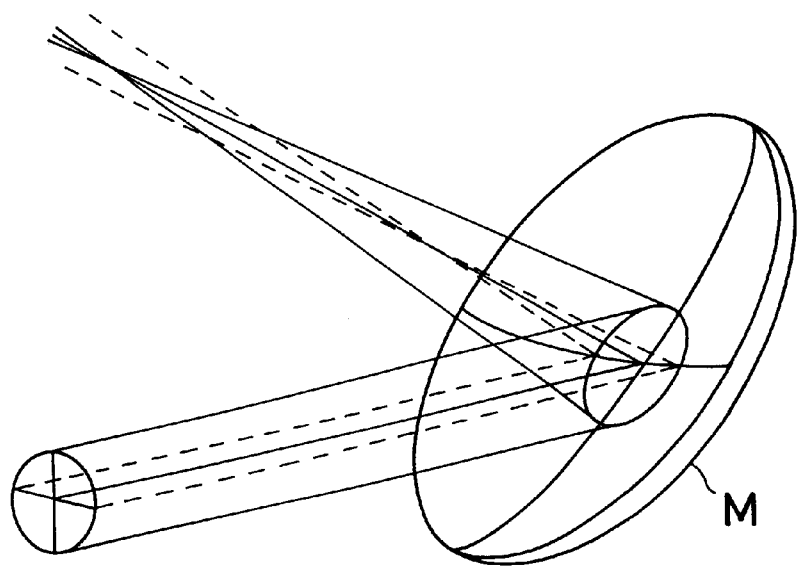
FIG. 17 is a conceptual view for describing astigmatism produced by a decentered reflecting surface.
Figure 18:
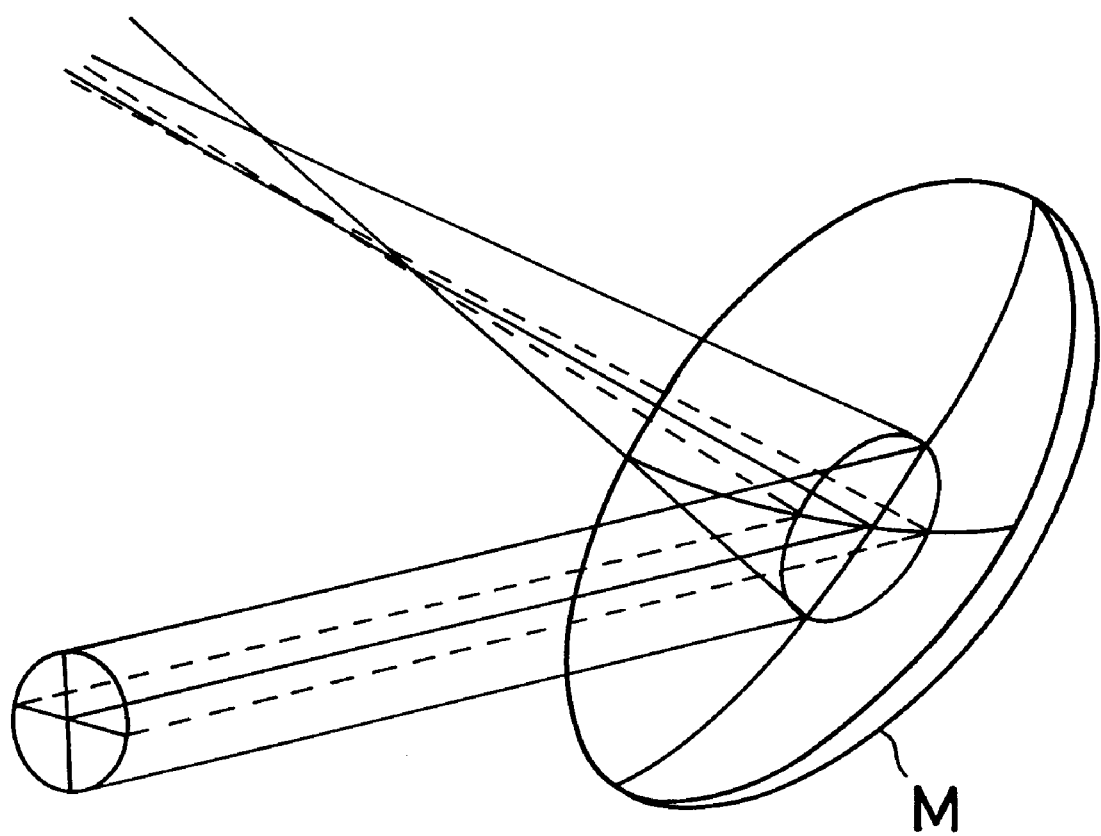
FIG. 18 is a conceptual view for describing coma produced by a decentered reflecting surface.
Figure 19:
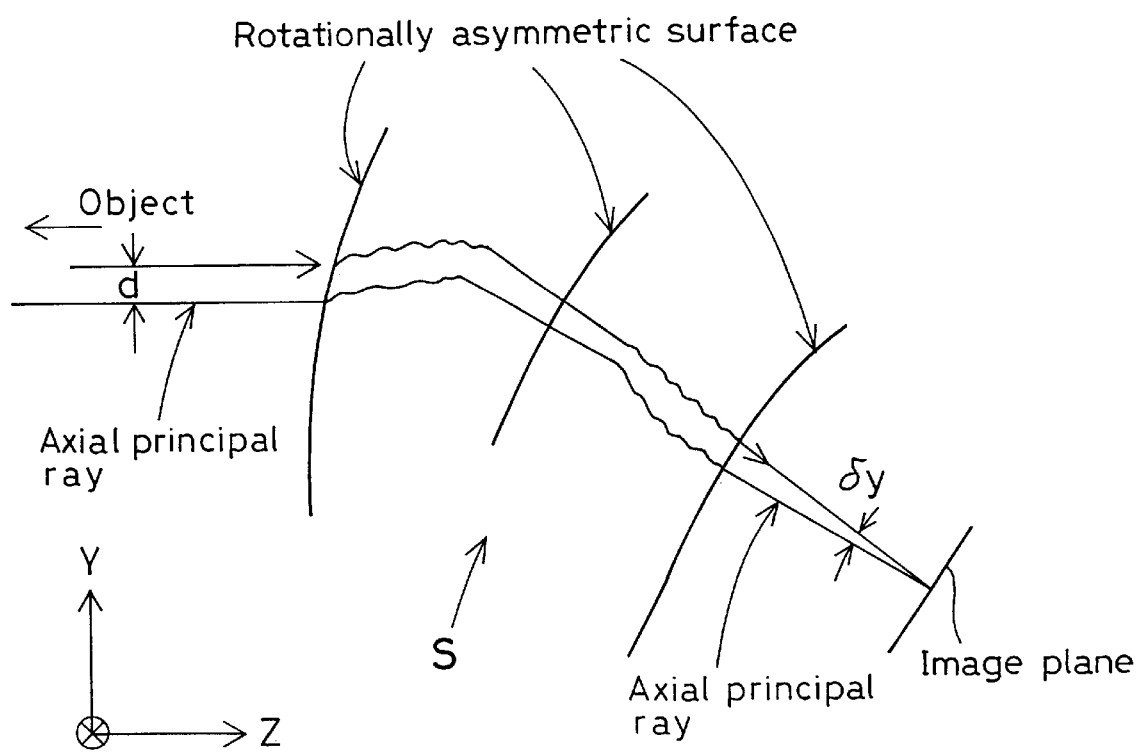
FIG. 19 is a diagram for describing the definition of the power of a decentered optical system and the power of an optical surface.

FIG. 13 shows an image display apparatus arranged for a single eye (in this case, the apparatus is designed for the left eye) in a state where the image display apparatus is fitted on an observer's head. FIG. 14 shows an image display apparatus arranged for two eyes in a state where the image display apparatus is fitted on an observer's head. FIG. 15 is a sectional view of the image display apparatus. A viewing optical system according to the present invention is used as shown in the sectional view of FIG. 15 (in this case, a viewing optical system having a configuration such as that shown in Example 4 is used). The viewing optical system forms a display apparatus body unit 31 in combination with a reflective LCD 3 and a light source 25 that illuminates the LCD 3. In the case of FIG. 13, the display apparatus body unit 31 is fixed by a support member through the observer's head such that the display apparatus body unit 31 is held in front of the observer's left eye. In the case of FIG. 14, two display apparatus body units 31 are fixed by a support member through the observer's head such that the display apparatus body units 31 are held in front of both the observer's eyes, respectively. As shown in FIG. 15, to protect the exit surface (the fifth surface 15 in the case of FIG. 15) of the ocular optical system, which faces the exit pupil 1, a cover member 26 is placed between the exit pupil 1 and the exit surface. As the cover member 26, any of a plane-parallel plate, a positive lens and a negative lens can be used.

The support member for the display apparatus body unit 31 has a pair of front frames 32 (left and right) each joined at one end thereof to the display apparatus body unit 31. The left and right front frames 32 extend from the observer's temples to the upper portions of his/her ears, respectively. A pair of rear frames 33 (left and right) are joined to the other ends of the left and right front frames 32, respectively, and extend over the left and right side portions of the observer's head. In the case of FIG. 14, the support member further has a top frame 34 joined at both ends thereof to the other ends of the left and right rear frames 33, respectively, such that the top frame 34 lies over the top of the observer's head.

A rear plate 35 is joined to one front frame 32 near the joint to the rear frame 33. The rear plate 35 is formed from an elastic member, e.g. a metal leaf spring. In the case of FIG. 14, a rear cover 36, which forms a part of the support member, is joined to the rear plate 35 such that the rear cover 36 can support the apparatus at a position behind the observer's ear in a region extending from the back part of the head to the base of the neck. A speaker 39 is mounted inside the rear plate 35 or the rear cover 36 at a position corresponding to the observer's ear.

A cable 41 for transmitting external image and sound signals is led out from the display apparatus body unit 31. In the case of FIG. 14, the cable 41 extends through the top frame 34, the rear frames 33, the front frames 32 and the rear plate 35 and projects to the outside from the rear end of the rear cover 36. In the case of FIG. 13, the cable 41 projects from the rear end of the rear plate 35. The cable 41 is connected to a video-replaying unit 40. It should be noted that reference numeral 40a in the figures denotes a switch and volume control part of the video-replaying unit 40.

The cable 41 may have a jack and plug arrangement attached to the distal end thereof so that the cable 41 can be detachably connected to an existing video deck or the like. The cable 41 may also be connected to a TV signal receiving tuner so as to enable the user to enjoy watching TV. Alternatively, the cable 41 may be connected to a computer to receive computer graphic images or message images or the like from the computer. To eliminate the bothersome cord, the head-mounted image display apparatus may be arranged to receive external radio signals through an antenna connected thereto.

As will be clear from the foregoing description, the present invention provides an image display apparatus including a relay optical system that forms an intermediate image of an image display device, and an ocular optical system having a semitransparent mirror and a concave mirror, wherein a decentered optical system is used in the relay optical system to fold an optical path, thereby making the optical system even more compact, and further the intermediate image magnifying power of the relay optical system is increased to thereby realize a wide field angle while keeping the power of the concave mirror part of the ocular optical system at a small value.

What we claim is:

1. In an image display apparatus having an image display device and a viewing optical system that leads an image formed by said image display device to a position where an eyeball of an observer is placed, the improvement wherein said viewing optical system has at least:

an image source-side reflecting surface having a decentered curved surface configuration that gives a power to a light beam emitted from said image display device when the light beam is reflected by said decentered curved surface, said image source-side reflecting surface further having a rotationally asymmetric surface configuration that corrects decentration aberrations produced by reflection at said decentered curved surface;

a semitransparent reflecting surface with half-mirror coating that transmits or reflects the light beam reflected from said image source-side reflecting surface; and a concave reflecting surface that forms a folded optical path between said concave reflecting surface and said semitransparent reflecting surface, said concave reflecting surface having a concave surface directed toward said semitransparent reflecting surface;

wherein an enlarged intermediate image of the image of said image display device is formed between said image source-side reflecting surface and said semitransparent reflecting surface.

2. An image display apparatus according to claim 1, wherein said viewing optical system has at least two surfaces, which are a first surface and a second surface that face each other across a medium having a refractive index larger than 1, said first surface being an entrance surface through which a light beam emitted from said image display device enters said medium, said second surface being said image source-side reflecting surface, and said first surface and said second surface being placed between said intermediate image and said image display device.

3. An image display apparatus according to claim 2, wherein said first surface has a rotationally asymmetric curved surface configuration that assists correction of decentration aberrations produced by said second surface.

4. An image display apparatus according to claim 2 or 3, wherein said viewing optical system has a third surface that faces said first surface and said second surface across said medium whose refractive index is larger than 1, said third surface being formed from at least a reflecting surface having a rotationally asymmetric curved surface configuration that gives a power to a light beam when reflecting the light beam and corrects decentration aberrations, and said third surface being placed in an optical path between said first surface and said semitransparent reflecting surface.

5. An image display apparatus according to any one of claims 1 to 3, wherein said semitransparent reflecting surface and concave reflecting surface of said viewing optical system are arranged so that a light beam from said image display device is passed through said semitransparent reflecting surface and then reflected by said concave reflecting surface, and the light beam reflected by said concave reflecting surface is reflected by said semitransparent reflecting surface.

6. An image display apparatus according to any one of claims 1 to 3, wherein said semitransparent reflecting surface and said concave reflecting surface are arranged so that a light beam from said image display device is reflected by said semitransparent reflecting surface and then reflected by said concave reflecting surface, and the light beam reflected by said concave reflecting surface is passed through said semitransparent reflecting surface.

7. An image display apparatus according to any one of claims 1 to 3, wherein said concave reflecting surface has a rotationally asymmetric curved surface configuration that corrects decentration aberrations produced in said viewing optical system.

8. An image display apparatus according to claim 6, wherein said concave reflecting surface serves as both a reflecting surface that reflects a light beam from said image display device and a transmitting surface that allows light from an outside world to enter said viewing optical system.

9. An image display apparatus according to claim 8, wherein said concave reflecting surface is formed from a thin-walled member having two approximately parallel concave surfaces that face each other across a medium having a refractive index larger than 1 so as to correct aberrations produced when light from the outside world enters through said concave reflecting surface.

10. An image display apparatus according to claim 9, wherein said thin-walled member has a thickness in a range of from 0.1 millimeter to 6.0 millimeters.

11. An image display apparatus according to claim 9, wherein the two concave surfaces of said thin-walled member have configurations formed so that an amount of distortion introduced into a light beam passing through said concave reflecting surface is within 10% in a region extending radially from a center of an effective surface area of said concave surfaces to have a radius that is one third of a radius of the effective surface area.

12. An image display apparatus according to claim 2 or 3, wherein said viewing optical system has:

a first prism including at least said first surface and said second surface;

said semitransparent reflecting surface placed separately from said first prism; and said concave reflecting surface placed separately from said first prism and said semitransparent reflecting surface.

13. An image display apparatus according to claim 2 or 3, wherein said viewing optical system has:

a first prism including at least said first surface and said second surface; and a second prism having at least said semitransparent reflecting surface and said concave reflecting surface.

14. An image display apparatus according to claim 2 or 3, wherein said viewing optical system comprises a prism, aid prism including at least said first surface, said second surface, said semitransparent reflecting surface, and said concave reflecting surface.

15. An image display apparatus according to any one of claims 1 to 3, wherein said semitransparent reflecting surface has a plane surface configuration.

16. An image display apparatus according to any one of claims 1 to 3, wherein at least one rotationally asymmetric curved surface of said viewing optical system is a plane-symmetry free-form surface having only one plane of symmetry.

17. An image display apparatus according to any one of claims 1 to 3, having said viewing optical system and a support member that retains said viewing optical system on a head of the observer to lead a light beam from said viewing optical system to the eyeball of the observer.

18. An image display apparatus according to claim 12, wherein said first prism has a first surface through which a light beam emitted from said image display device enters said medium, a second surface that reflects the light beam entering through said first surface, and a third surface that reflects the light beam reflected from said second surface, wherein an optical path connecting said first surface and said second surface and an optical path reflected from said third surface intersect each other in said medium, and wherein when a decentration direction of said optical system is a Y-axis direction, and a plane parallel to an axial principal ray is a YZ-plane, and further a direction perpendicularly intersecting the YZ-plane is an X-axis direction, either of the following conditions is satisfied:

$$-2.0 < PxS3/Px < 3.5 \quad (1)$$

$$-2.5 < PyS3/Py < 3.5 \quad (2)$$

where Px is an absolute value of a power in the X-axis direction of said optical system; Py is an absolute value of a power in the Y-axis direction of said optical system; PxS3 is a power in the X-axis direction of said third surface; and PyS3 is a power in the Y-axis direction of said third surface.

19. An image display apparatus according to claim 12, wherein said first prism has a first surface through which a light beam emitted from said image display device enters said medium, a second surface that reflects the light beam entering through said first surface, and a third surface that reflects the light beam reflected from said second surface, wherein an optical path connecting said first surface and said second surface and an optical path reflected from said third surface intersect each other in said medium, and wherein when a decentration direction of said optical system is a Y-axis direction, and a plane parallel to an axial principal ray is a YZ-plane, and further a direction perpendicularly intersecting the YZ-plane is an X-axis direction, either of the following conditions is satisfied:

$$-2.0 < PxS2/Px < 3.5 \quad (3)$$

$$-1.5 < PyS2/Py < 4.5 \quad (4)$$

where Px is an absolute value of a power in the X-axis direction of said optical system; Py is an absolute value of a power in the Y-axis direction of said optical system; PxS2 is a power in the X-axis direction of said second surface; and PyS2 is a power in the Y-axis direction of said second surface.

20. An image display apparatus according to claim 12, wherein said first prism has a first surface through which a light beam emitted from said image display device enters said medium, a second surface that reflects the light beam entering through said first surface, and a third surface that reflects the light beam reflected from said second surface, wherein an optical path connecting said first surface and said second surface and an optical path reflected from said third surface intersect each other in said medium, and wherein when a decentration direction of said optical system is a Y-axis direction, and a plane parallel to an axial principal ray is a YZ-plane, and further a direction perpendicularly intersecting the YZ-plane is an X-axis direction, either of the following conditions is satisfied:

$$-1.5 < PxS3/PxHP < 3.0 \quad (5)$$

$$-3.0 < PyS3/PyHP < 2.5 \quad (6)$$

where PxS3 is a power in the X-axis direction of said third surface; PyS3 is a power in the Y-axis direction of said third surface; PxHP is a power in the X-axis direction of said first prism; and PyHP is a power in the Y-axis direction of said first prism.

21. An image display apparatus according to claim 12, wherein said first prism has a first surface through which a light beam emitted from said image display device enters said medium, a second surface that reflects the light beam entering through said first surface, and a third surface that reflects the light beam reflected from said second surface, wherein an optical path connecting said first surface and said second surface and an optical path reflected from said third surface intersect each other in said medium, and wherein when a decentration direction of said optical system is a Y-axis direction, and a plane parallel to an axial principal ray is a YZ-plane, and further a direction perpendicularly intersecting the YZ-plane is an X-axis direction, either of the following conditions is satisfied:

$$-2.0 < PxS2/PxHP < 2.5 \quad (7)$$

$$-2.0 < PyS2/PyHP < 4.0 \quad (8)$$

where PxS2 is a power in the X-axis direction of said second surface; PyS2 is a power in the Y-axis direction of said second surface; PxHP is a power in the X-axis direction of said first prism; and PyHP is a power in the Y-axis direction of said first prism.

* * * * *